US012711020B2

(12) United States Patent
Karuppur Rajagopalan et al.

(10) Patent No.: US 12,711,020 B2
(45) **Date of Patent: *Aug. 18, 2026**

(54) PRELIMINARY PROCESSING FOR DATA MANAGEMENT OF DATA OBJECTS

(71) Applicant: Rubrik, Inc., Palo Alto, CA (US)

(72) Inventors: Ganesh Karuppur Rajagopalan, Los Gatos, CA (US); Pandian Raju, Sunnyvale, CA (US); Prakhar Kumar, Gurugram (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/977,637

(22) Filed: Dec. 11, 2024

(65) Prior Publication Data

US 2025/0103442 A1 Mar. 27, 2025

Related U.S. Application Data

(63) Continuation of application No. 18/365,516, filed on Aug. 4, 2023, now Pat. No. 12,210,423.

(51) Int. Cl.
*G06F 11/14* (2026.01)
*G06F 11/1446* (2026.01)

(52) U.S. Cl.
CPC ...... *G06F 11/1466* (2013.01); *G06F 11/1453* (2013.01); *G06F 11/1469* (2013.01); *G06F 2201/84* (2013.01)

(58) Field of Classification Search
CPC ............ G06F 11/1466; G06F 11/1453; G06F 11/1469; G06F 2201/84; G06F 2201/80; G06F 11/1464; G06F 11/1451
See application file for complete search history.

(56) References Cited

U.S. PATENT DOCUMENTS

| | | | |
|---|---|---|---|
| 6,505,216 | B1 | 1/2003 | Schutzman et al. |
| 8,296,271 | B1 | 10/2012 | Richardson et al. |
| 8,478,726 | B2 | 7/2013 | Habermann et al. |
| 9,384,200 | B1 | 7/2016 | Batchu et al. |
| 9,483,485 | B1 | 11/2016 | Chockalingam et al. |
| 2003/0061456 | A1 | 3/2003 | Ofek et al. |
| 2004/0267822 | A1 | 12/2004 | Curran et al. |
| 2009/0024813 | A1 | 1/2009 | Uysal et al. |
| 2011/0082832 | A1 | 4/2011 | Vadali et al. |
| 2012/0226664 | A1 | 9/2012 | Habermann et al. |

*Primary Examiner* — Kevin Verbrugge
(74) *Attorney, Agent, or Firm* — Holland & Hart LLP

(57) ABSTRACT

Methods, systems, and devices for data management are described. A first procedure for capturing first point-in-time data for a data object may be performed and may include initiating a first type of operation to back up the first point-in-time data, the first operation being native to the data object and enabling sections of files to be backed up in parallel on a per-section basis. A second procedure for restoring the first point-in-time data to the computing system may also be performed. Performing the second procedure may include executing, based on recreating the first point-in-time data, the first type of operation to backup sections of first files of the first point-in-time data in parallel on the per-section basis to the computing system. And further include initiating a second type of operation to restore second files of the first point-int-time data in parallel on a per-file basis to the computing system.

20 Claims, 10 Drawing Sheets

700

800

Figure 10:
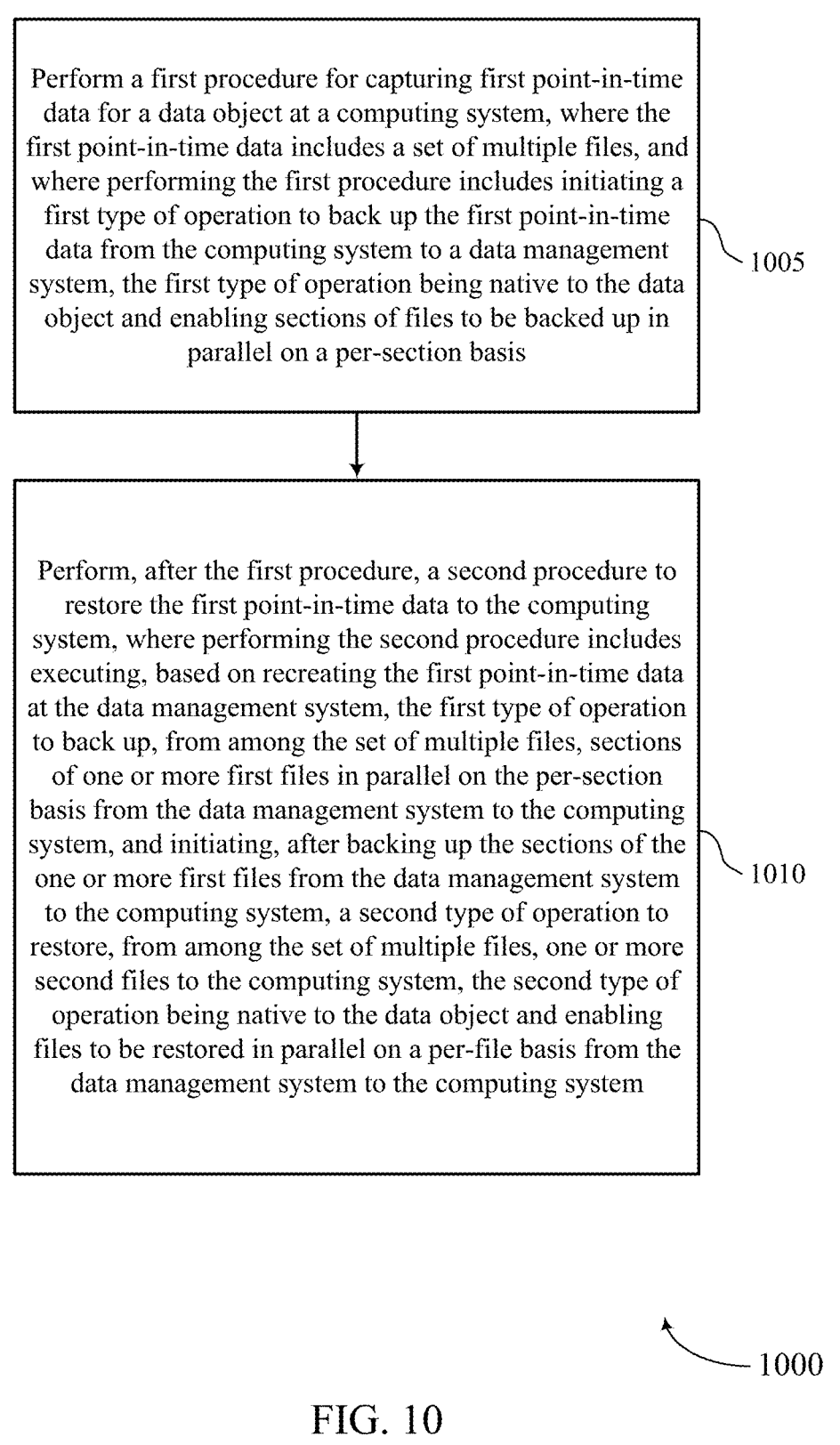

Perform a first procedure for capturing first point-in-time data for a data object at a computing system, where the first point-in-time data includes a set of multiple files, and where performing the first procedure includes initiating a first type of operation to back up the first point-in-time data from the computing system to a data management system, the first type of operation being native to the data object and enabling sections of files to be backed up in parallel on a per-section basis

1005

Perform, after the first procedure, a second procedure to restore the first point-in-time data to the computing system, where performing the second procedure includes executing, based on recreating the first point-in-time data at the data management system, the first type of operation to back up, from among the set of multiple files, sections of one or more first files in parallel on the per-section basis from the data management system to the computing system, and initiating, after backing up the sections of the one or more first files from the data management system to the computing system, a second type of operation to restore, from among the set of multiple files, one or more second files to the computing system, the second type of operation being native to the data object and enabling files to be restored in parallel on a per-file basis from the data management system to the computing system

PRELIMINARY PROCESSING FOR DATA MANAGEMENT OF DATA OBJECTS

CROSS REFERENCE

The present Application for Patent is a continuation of U.S. patent application Ser. No. 18/365,516 by Rajagopalan et al., entitled "PRELIMINARY PROCESSING FOR DATA MANAGEMENT OF DATA OBJECTS," filed Aug. 4, 2023, assigned to the assignee hereof, and expressly incorporated by reference herein.

FIELD OF TECHNOLOGY

The present disclosure relates generally to data management, including techniques for preliminary processing for management of data objects.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIG. 10 shows a flowchart illustrating methods that support preliminary processing for management of data objects in accordance with aspects of the present disclosure.

DETAILED DESCRIPTION

Figure 1:
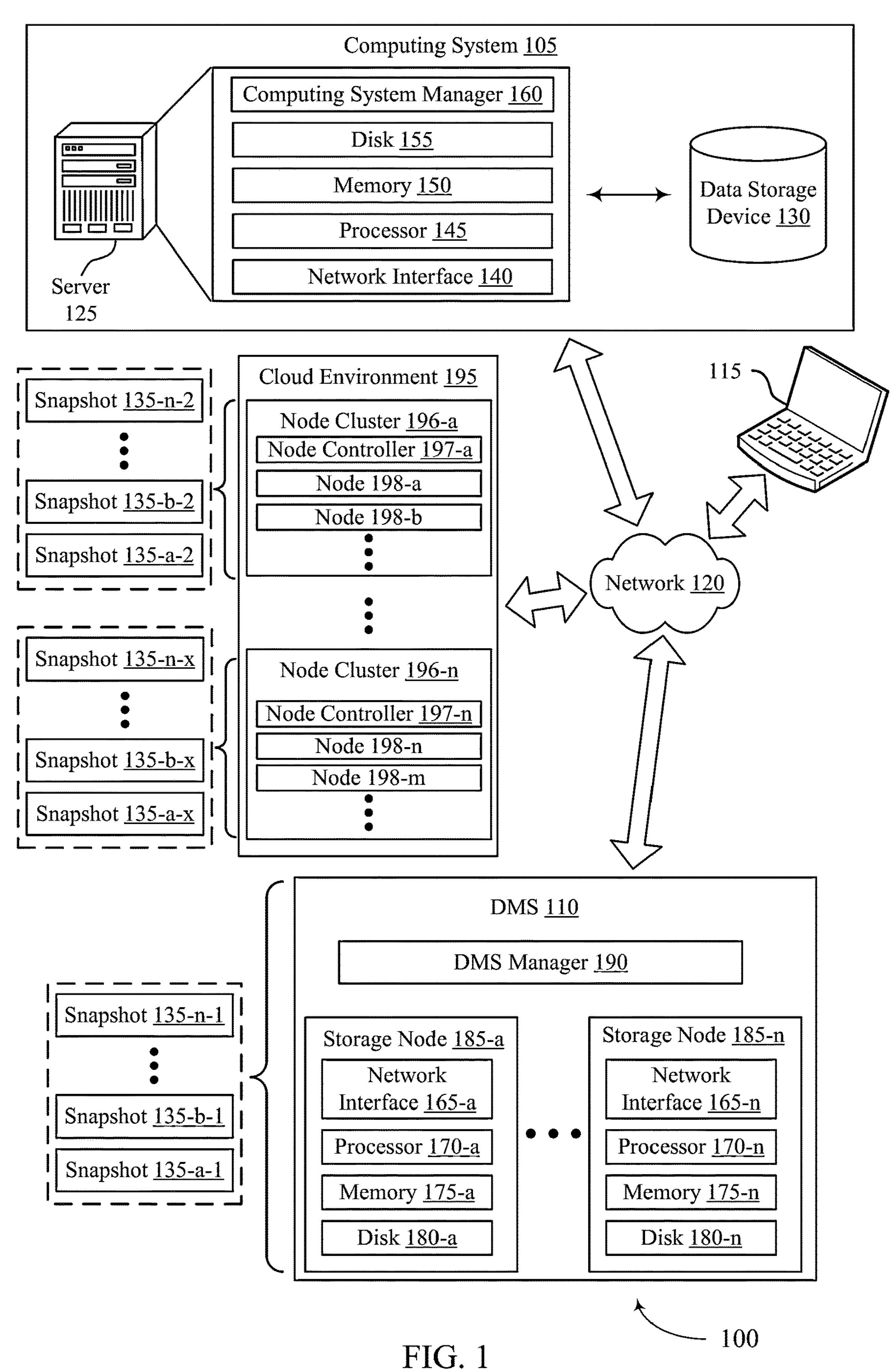
FIG. 1 illustrates an example of a computing environment that supports preliminary processing for management of data objects in accordance with aspects of the present disclosure.

A data management system (DMS) may provide data management services (e.g., backup, restore, duplication, failover, data analysis, threat detection) for data objects (e.g., data, file systems, applications, databases) implemented at a computing system. The DMS may coordinate with an agent installed at (e.g., on) the computing system to perform the data management services for the data objects. In some examples, the agent may further coordinate with the data objects to affect a data management operation. In some cases, to perform a data management service, the agent may execute data management operations that are native to the data object. For example, the agent may execute a native backup operation, a native restore operation, a native duplication operation, or the like, to support a corresponding data management service provided by the DMS.

Some data objects implemented at a computing system may support the generation of files that are larger than a threshold size (e.g., larger than 500 Gigabytes). Such files may be referred to as "very large files." For data objects that support very large files and for which native operations are used to support data management services of the DMS, the execution of the data management services may experience significant latency if the native operations fail to support parallelized processing of sections of individual files. In some examples, a data object may support parallelized processing of sections of individual files for some data management operations (e.g., backup operations) but not others (e.g., restore operations, duplication operations). Accordingly, for a data object, execution of some data management services may experience significant latency.

Thus, mechanisms (e.g., techniques, components, configurations) that enable all data management functions (e.g., backup, restoration duplication) to support parallelized processing of sections of individual files (e.g., on a per-section basis) for data objects (e.g., that support very large files, that do not have native functions that support per-section processing for all data management functions) may be desired.

To support parallelized processing of sections of individual files for all data management functions, a first set of files (e.g., files that exceed a threshold size) of a data object may be transferred during a preliminary operation of a data management procedure (e.g., a restoration procedure or duplication procedure) for which native operations (e.g., restoration operation, or duplication operation) that support parallelized processing of files on a per-section basis are not available—the first set of files may be transferred using a native operation (e.g., a section-wise backup operation) of the data object that does support parallelized processing of files on a per-section basis. And a second set of files (e.g., the remaining files) of the data object may be transferred during a following operation of the data management procedure—e.g., using a native operation (e.g., restoration operation, or duplication operation) that does not support parallelized processing of files on a per-section basis.

FIG. 1 illustrates an example of a computing environment 100 that supports preliminary processing for management of data objects in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random-access memory (SRAM), dynamic random-access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a file system, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or file systems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

A computing system (such as the computing system 105) may support data objects (e.g., applications, virtual machines, file systems, databases) that support the generation of files that are individually capable of storing very large amounts of data (e.g., up to 128 terabytes of data). For example, the computing system may support the operation of an Oracle database, which may support the generation of Bigfile Tablespaces. In some examples, such data objects may include native functionality for backing up the data of the data object to an image backup file (which may be a byte-for-byte backup of the data object). Additionally, or alternatively, such data objects may include native functionality for restoring the data in an image backup file to the data object, another instance of the data object (e.g., that shares a same name or unique identifier), or another (e.g., duplicate or failover) deployment of the data object. Additionally, or alternatively, such data objects may include native functionality for duplicating the data of a data object to another instance or deployment of the data object.

In some examples, the native image backup functionality for a data object may be used to backup individual files (e.g., user files, control files, system files) of the data object sequentially—e.g., one file at a time, on a per-file basis. The native image backup functionality may be further capable of backing up multiple files in parallel (using multiple computing threads), though each thread may be configured to backing up complete files. In such cases, very large files (which may refer to files larger than a threshold size, e.g., larger than 500 Gigabytes) may present a bottleneck to a backup task using the native backup functionality—e.g., one very large file may prevent a backup task from completing until a designated computing thread completes the backup of the very large file.

For example, if a data object stores all of its data in a single very large file, then the backup task may be executed using a single computing thread and the duration of the backup task may, thus, be based on the processing capability of the single computing thread. Additionally, other computing threads may be available for the backup task may go unused. Similarly, if a data object stores a majority of its data in a single very large file, then a single computing thread may be used to the backup the large file and the duration of the backup task may, effectively, be based on the processing capability of the single computing thread. In such cases, other computing threads may be available to backup the other smaller files but once the other smaller files are backed up, these computing threads may go unused for the remainder of the backup task. In yet other examples, a data object may store its data in a balanced mix of differently sized files. In such cases, a very large file may present a bottleneck based on its size and/or when backup is initiated for the very large file. That is, if the very large file is greater than a threshold (e.g., greater than a terabyte), a duration for backing up the very large file using a computing thread may exceed a duration for backing up all of the other files. Also, if an operation for backing up a very large file begins near an end of the backup task, then the duration of the backup task may extend until the backup of the very large file completes, even though the backup of the remaining files may be completed.

To reduce a bottleneck caused by very large files in an image backup task, the data object may be further capable of backing up sections (which may also be referred to as portions) of individual files in parallel (e.g., on a per-section basis). In such cases, individual files (e.g., that are larger than a threshold size) may be broken into sections (e.g., sections of a particular size), and multiple computing threads may be used to backup the sections of individual files in parallel. In some examples, the data object may support a dedicated command (e.g., a partitioned image backup command) that enables parallelized backup of individual files of the data object in sections.

In some examples, the native restoration functionality for the data object may be used to restore individual files of the data object from a previous image backup—e.g., to a current instance of the data object that was to generate the image backup, another (e.g., new) instance of the data object, a separate deployment of the data object. In some examples, (with contrast to a backup process) a restoration process may include operations for ensuring that the files of the data object are restored in such a way that enables the restored data object to run (e.g., to support user functions) at a conclusion of the restoration. For example, the restoration process may first restore control files for the data object that can be used to support the operation of the data object before restoring data files to the data object. In some examples, the native restoration functionality may support the restoration of individual files in parallel (e.g., on a per-file basis), but may not support the restoration of sections of the individual files in parallel (e.g., on a per-section basis). Thus, very large files may present a bottleneck to restoring data from an image backup.

In some examples, the native duplication functionality for the data object may be used to duplicate individual files of one deployment of the data object (e.g., on a first computing system) to a separate deployment of the data object (e.g., on a second computing system). In some examples, (with contrast to a backup process) a duplication process may include operations for ensuring that the files of the data object are restored in such a way that enables the duplicated data object to run (e.g., to support user functions) at a conclusion of the duplication. For example, the restoration process may first duplicate control files for the data object that can be used to support the operation of the data object before duplicating data files to the data object. In some examples, the native duplication functionality may support the duplication of individual files in parallel but may not support the duplication of sections of the individual files in parallel. Thus, very large files may present a bottleneck to duplicating data from one data object to another.

As noted herein, the DMS 110 may be configured to manage data stored at one or more computing systems (such as the computing system 105). For example, the DMS 110 may be configured to provide one or more data management services (e.g., a backup service, a restoration service, a duplication service, a data analysis service) for a computing system, for one or more data objects running at the computing system, or the like. In some examples, an agent of the DMS 110 is installed at the computing system and facilitates (e.g., in coordination with the DMS 110) the execution of the data management services for the computing system.

In some examples, the agent of the DMS 110 is configured to extend the data management services of the DMS 110 to a data object of the computing system, where the data object may support the generation of very large files. In such cases, the agent of the DMS 110 may be configured to assist the backup (e.g., as snapshot or data backup files) of the data object to the DMS 110. In some examples, to assist the backup of the data object, the agent of the DMS 110 may be configured to execute an image backup operation that is native to the data object to cause the data object to transfer its data to an image backup at a desired location (e.g., at the DMS 110). In some examples, the agent of the DMS 110 (and/or the DMS 110) may be configured to store the transferred data in a data backup or snapshot format. In some cases, a first backup of the data object may be a full (byte-for-byte) backup of the data (e.g., user and control data) of the data object and may be stored as a base backup. Subsequent backups of the data object may be incremental backups of the data of the data object and may be stored as incremental backups (e.g., on top of the base backup and/or other intervening backups). In some examples, the agent of the DMS 110 is used to monitor changes (e.g., additions, deflection, modifications) in the data of the data object from one backup to another and to transfer and/or indicate the data changes to the DMS 110 to be stored in incremental backups. To reduce a latency of an image (byte-for-byte) backup operation, the agent may be configured to execute a partitioned image backup operation that is native to the data object and enables sections of individual files to be transferred to the image backup in parallel (e.g., on a per-section basis).

The agent of the DMS 110 may be further configured to assist the DMS 110 in the restoration of the data object to a desired point-in-time from a previously captured backup. In some examples, to assist in the restoration of the data object, the agent of the DMS 110 may be configured to execute a restoration operation that is native to the data object to cause the desired point-in-time data to be restored to the data object from the image backup. In some examples, prior to transferring the data from the image backup, the DMS 110 may recreate the files of the desired point-in-time data from one or more backups (which may be referred to as materializing the snapshot that corresponds to the point-in-time). After the files of the data object are recreated for the point-in-time, the agent of the DMS 110 (e.g., in coordination with the DMS 110) may restore the files to the data object. However, as described herein, native restoration operation of the data object may prevent the agent from restoring sections of individual files to the data object in parallel (e.g., on a per-section basis), which may significantly increase a latency of the restoration process.

Additionally, or alternatively, the agent of the DMS 110 may be further configured to assist the DMS 110 in the duplication of the data object to another location. In some examples, to assist in the duplication of the data object, the agent of the DMS 110 may be configured to execute a duplication operation that is native to the data object to cause data at the data object to be duplicated to another deployment of the data object. However, as described herein, native duplication operation of the data object may prevent the agent from duplicating sections of individual files to the data object in parallel (e.g., on a per-section basis), which may significantly increase a latency of the duplication process.

Thus, mechanisms (e.g., techniques, components, configurations) that enable all data management functions (e.g., backup, restoration duplication) to support parallelized processing of sections of individual files (e.g., on a per-section basis) for data objects (e.g., that support very large files, that do not have native functions that support per-section processing for all data management functions) may be desired.

To support parallelized processing of sections of individual files for all data management functions, a first set of files (e.g., files that exceed a threshold size) of a data object may be transferred during a preliminary operation of a data management procedure (e.g., a restoration procedure or duplication procedure) for which native operations (e.g., restoration operation, or duplication operation) that support parallelized processing of files on a per-section basis are not available—the first set of files may be transferred using a native operation (e.g., a section-wise backup operation) of the data object that does support parallelized processing of files on a per-section basis. And a second set of files (e.g., the remaining files) of the data object may be transferred during a following operation of the data management procedure—e.g., using a native operation (e.g., restoration operation, or duplication operation) that does not support parallelized processing of files on a per-section basis.

In some examples, the DMS 110 may be configured to perform a first procedure (e.g., a backup or snapshot procedure) for capturing, at a first point-in-time, data for a data object (e.g., a database that supports very large files) at the computing system 105. Performing the first procedure may include initiating (e.g., via an agent of the DMS 110) an operation (e.g., a backup operation) for backing up the data currently stored at the computing system 105 for the data object at the first point-in-time. The first operation may be native to the data object and may enable the data object to backup sections of individual files from the computing system 105 to the DMS 110 in parallel (e.g., using a partitioned image backup technique). That is, the first operation may enable section-wise backup of individual files (e.g., very large files) of the data object to a backup destination in parallel (e.g., on a per-section basis), with reduced latency. In some examples, initiating the backup operation causes the data object to back up one or more files to a designated backup location.

In some examples, the first operation may be used to generate an image (byte-for-byte) backup at the DMS 110. In some examples, the DMS 110 may generate a backup for the first point-time using the data transferred to the DMS 110 by the initiated backup operation. In some examples, the DMS 110 generates a base backup for the first point-in-time that includes the full data of the data object (e.g., if the backup operation is for an initial backup of the data object). In other examples, the DMS 110 generates an incremental backup for the first point-in-time (e.g., on top of a base backup and, in some examples, an incremental backup taken for earlier points-in-time). For incremental backups, a portion of the data of the data object may be transferred to the DMS 110 (e.g., only files or portions of files that have been added or modified). Within the backup(s) stored for the data object, the DMS 110 may store the full data of (and be capable of recreating) the data object at one or more points-in-time.

The DMS 110 may be further configured to perform a two-part second procedure (e.g., a two-part restoration procedure) for restoring the data object at the computing system 105 to the first point-in-time data. Prior to performing the second procedure, the DMS 110 may be configured to recreate the data of the data object (e.g., the files of the data object to be restored) from one or more backups that are used to preserve the version of the data object captured at the first point-in-time. In some examples, the DMS 110 may mount the data of the data object at one or more mounting locations at the DMS 110 that are accessible to the computing system 105 (e.g., via a network connection).

Performing the second procedure may include first performing a pre-processing operation (e.g., a pre-restore operation) that involves executing (e.g., by the agent) the partitioned image backup operation that is native to the data object to back up a first set of files (e.g., files that exceed a size threshold) of the recreated first point-in-time data, where the backup destination is set as a location at the computing system 105 used to support the operation of the data object being restored. That is, the pre-processing step may involve running a partitioned image backup operation (in a reverse direction) from the DMS 110 to the computing system 105.

After completing the pre-processing operation (after the first set of files have been backed up to the location at the computing system), the DMS 110 may be configured to initiate (e.g., via the agent) a second operation (e.g., a restore operation) to restore a second set (e.g., the remaining files) of the data object to the computing system. The second operation may be native to the data object and enable individual files (but not sections of individual files) to be restored to the computing system in parallel. That is, the second operation may enable file-wise restoration of files to the data object in parallel (e.g., on a per-file basis). In some examples, initiating the restore operation causes the data object to restore or more files to a designated restore location (e.g., the location designated for the pre-processing operation) at the computing system 105 from a designated backup location (e.g., a mounting location at the DMS 110). The restore operation may be further configured to skip the restoration of files that were restored during the pre-processing operation.

Though discussed in the context of a restoration procedure, which involves restoring a previously backed up data object, it is noted that the above techniques may similarly be applied to a restoration procedure that involves restoring a data object at a computing system from a backup obtained from a different data object (e.g., a different instance of the data object at the computing system, a different deployment of the data object at a different computing system). It is further noted that the above techniques may similarly be applied to a duplication procedure. In such cases, the partitioned image backup technique may be used during a pre-processing step of the duplication procedure to transfer a first set of files from an image backup of the data object stored at the DMS 110 to a data object at a different computing system, from the data object at the computing system 105 to the data object at the different computing system. And a native duplication operation may be applied during a following step of the duplication procedure used to transfer a second set of files from the computing system 105 to another computing system.

By installing an agent of the DMS 110 at the computing system 105, the agent may be able to extend (e.g., share) a capability of one function (e.g., a section-wise backup function) of the data object to other functions (e.g., a restoration function, a duplication function) of the data object. Also, by repurposing a section-wise backup operation that is native to a data object to perform pre-restoration and/or pre-duplication procedures, a latency associated with restoring and/or duplicating very large files of a data object may be reduced without modification to the functionality of the data object.

Figure 2:
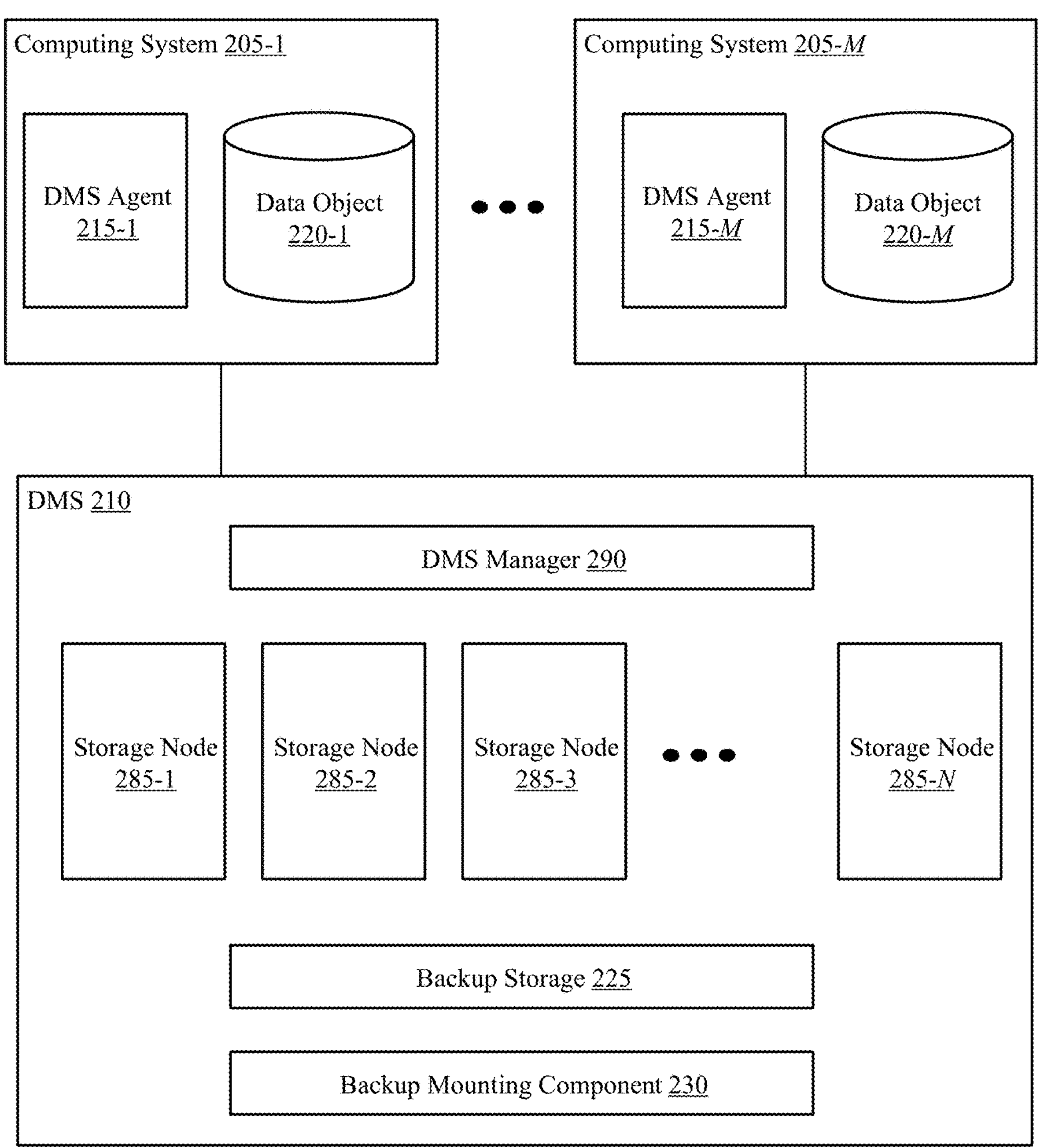
FIG. 2 shows an example of a subsystem that supports preliminary processing for management of data objects in accordance with aspects of the present disclosure.

FIG. 2 shows an example of a subsystem that supports preliminary processing for management of data objects in accordance with aspects of the present disclosure.

The subsystem 200 may include one or more computing systems 205 and the DMS 210, which may be respective examples of computing systems (e.g., the computing system 105 of FIG. 1) and a DMS (e.g., the DMS 110 of FIG. 1) described herein.

The DMS 210 may include the DMS manager 290, one or more storage nodes 285, a backup storage 225, and a backup mounting component 230. The DMS manager 290 may be an example of a DMS manager (e.g., the DMS manager 190 of FIG. 1) described herein. The DMS manager 290 may be configured to manage the capture (e.g., in coordination with the DMS agent 215), storage, restoration, and/or duplication of data of one or more computing system (e.g., the first computing system 205-1) and/or one or more data objects (e.g., the first data object 220-1) at the computing systems at different points in time.

In some examples, the DMS manager 290 is configured to capture the data of the computing systems using base and incremental backups. A base backup (which may also be referred to as a full backup) may capture a full set of data (e.g., user data, system data, file system data, metadata for the data, states of the data, configurations) stored at a computing system at a first point-in-time. An incremental backup may capture an incremental set of data stored at the computing system at a second point-in-time, where the incremental set of data may capture differences (e.g., modifications, additions, deletions) between the full set of data at the first point-in-time and the full set of data at the computing system at the second point-in-time. The incremental backups may enable the computing system and/or data objects at the computing system to be backed up at many different points-in-time with reduced storage resources, reduced data transfer, and the like.

In some examples, one or more backups taken by the DMS manager 290 may compose image backups of the computing systems and/or data objects at the computing systems at different point-in-times. As described herein, image backups may be byte-for-byte backups of the computing systems and/or data objects at the computing systems, and thus may be used to completely restore the computing systems and/or data objects—e.g., in the event of a catastrophic failure of the computing systems or one or more data object.

The backup storage 225 may be configured to store backup files (e.g., image backup files, snapshot files) that reflect data captured from the computing systems and/or from data objects at the computing systems at different points in time. The backup storage 225 may store base and incremental backups that reflect data of the computing systems and/or data objects at the computing systems at many different points-in-time. In some examples, the backup files stored in the backup storage 225 may be able to fully recreate the computing systems and/or data object at each of the points-in-time. Full recreation may include a restoration of all data files, metadata, and system files in a same state as they are natively stored at the computing systems and/or data object (e.g., using a same folder structure, same file naming, same file organization)

The backup mounting component 230 may be configured to recreate and mount the point-in-time data—e.g., using resources of the DMS manager 290 that are accessible via a network connection. Recreating the point-in-time data may also be referred to as materializing the point-in-time data. As part of recreating the data, the backup mounting component 230 may restore all of the data files, metadata, and system files in a same state as they were natively stored at a computing system at a point-in-time to a location within the DMS 210 that is accessible via a network connection (e.g., a network file system (NFS) connection, a file transfer protocol (FTP) connection, a Web Distributed Authoring and Versioning (WebDAV) connection).

The one or more storage nodes 285 may be examples of storage nodes described herein (e.g., the one or more storage nodes 185 of FIG. 1). The one or more storage nodes 285 may assist in the capture, storage, restoration, and/or duplication of data of the computing systems. In some examples, the tasks for performing the foregoing functions may be allocated amongst the one or more storage nodes 285, which may improve processing/signaling bandwidth, increase an amount of processing resources available for a data management procedure, and the like. In some examples, the one or more storage nodes 285 may be used to form a distributed mounting point for data files recreated by the backup mounting component 230, where the one or more storage nodes 285 may present as a single or multiple network drives mountable to a computing system.

The one or more computing systems may include one or more DMS agents and one or more data objects. The computing systems may be physical or virtual machines (e.g., computers, servers). An operating system (e.g., a Linux server operating system) may be installed at the computing systems, where the operating system may support the installation and operation of data objects (e.g., applications, databases, file systems, virtual machines) at the computing systems. In some examples, the operating system may enable the operation of the DMS agents and the data objects. In some examples, the operating system may manage a higher-layer file system within which data objects may manage their respective files (using a same, similar, or different file system).

The data objects may be applications, virtual machines, databases, file systems. In some examples, the first data object 220-1 is a database (e.g., an Oracle database). The first data object 220-1 may also support the storage of data for the data object in very large files (e.g., files that are larger than a threshold size). In some examples, all of the data for the first data object 220-1 may be stored in a single file (e.g., a BigFile Tablespace). The first data object 220-1 may include native functions for managing the data of the data object. For example, the first data object 220-1 may include native functions that support the operation of the data object, such as functions for packaging data, organizing data, querying data, accessing data, deleting data, and adding data.

The first data object 220-1 may also include native functions for backing up data, restoring data, and duplicating data. In some examples, one of these native functions (e.g., the backup function) may include support for transferring files on a per-file or per-section basis. While other of these native functions (e.g., the restoration and duplication functions) may support transferring files on a per-file basis. As described herein, very large files transferred during a backup, restoration, or duplication procedure may act as a bottleneck and introduce significant latency into such procedures if transferred on a per-file basis.

The DMS agents may be configured to execute (e.g., in coordination with the DMS manager 290) data management functions for the computing system. For example, the first DMS agent 215-1 may be configured to execute a backup procedure for the first computing system 205-1 and/or one or more data objects at the first computing system 205-1—e.g., in accordance with a backup schedule set by the DMS manager 290. As part of the backup procedure, the first DMS agent 215-1 may be configured to trigger a native backup operation at the first data object 220-1. In some examples, the first DMS agent 215-1 may be configured to trigger a native section-wise image backup operation at the first data object 220-1. As part of triggering the native section-wise image backup operation, the first DMS agent 215-1 may be configured to indicate a target location at the DMS 210 for the data of the first data object 220-1 to be written. As described herein, the native section-wise image backup operation enables sections of files (e.g., very large files) to be backed up to the DMS 210 on a per-section basis, which may mitigate backup bottleneck that may otherwise be caused by a file-wise backup of very large files.

The first DMS agent 215-1 may also be configured to execute a restoration procedure for the first computing system 205-1 and/or one or more data objects at the first computing system 205-1. In some examples, the first DMS agent 215-1 may receive a restoration request from the first computing system 205-1 and may communicate the restoration request to the DMS manager 290 (to enable the DMS manager 290 and the first DMS agent 215-1 to coordinate the restoration). Additionally, or alternatively, the restoration request may be received at the DMS 210 and communicated to the first DMS agent 215-1 (to enable the DMS manager 290 and first DMS agent 215-1 to coordinate the restoration). As described herein, the restoration procedure for point-in-time data may be performed in multiple phases.

As a first phase of the restoration procedure, the first DMS agent 215-1 may execute a pre-restoration script that triggers the first data object 220-1 to execute the section-wise backup operation in reverse (from a location at the DMS 210 to a location at the first computing system 205-1 associated with the first data object 220-1). The pre-restoration script may trigger the first data object 220-1 to back up a first subset of files of the point-in-time data recreated at the DMS 210 to the location at the first computing system 205-1.

As a second phase of the restoration procedure, the first DMS agent 215-1 may execute a restoration script that triggers the first data object 220-1 to execute a native restoration operation that restores a second subset of files (excluding the pre-restored files) from the DMS 210 to the location at the first computing system 205-1. The restoration procedure is described in more detail herein, including with reference to FIG. 3.

The first DMS agent 215-1 may also be configured to execute a duplication procedure for the first computing system 205-1 and/or one or more data objects at the first computing system 205-1. In some examples, the first DMS agent 215-1 may receive a duplication request from the first computing system 205-1 and may communicate the duplication request to the DMS manager 290 (to enable the DMS manager 290 and the first DMS agent 215-1 to coordinate the duplication). Additionally, or alternatively, the duplication request may be received at the DMS 210 and communicated to the first DMS agent 215-1 (to enable the DMS manager 290 and first DMS agent 215-1 to coordinate the duplication). As described herein, the duplication procedure may be performed in multiple phases.

In some examples, as a first phase of the duplication procedure, the first DMS agent 215-1 may execute a pre-duplication script that triggers the first data object 220-1 to execute the section-wise backup operation (to a location at the Mth computing system 205-M associated with the Mth data object 220-M). The pre-duplication script may trigger the first data object 220-1 to back up a first subset of files currently stored at the first data object 220-1 to the location at the Mth computing system 205-M.

In other examples, as a first phase of the duplication procedure, the Mth DMS agent 215-M may execute a pre-duplication script that triggers the Mth data object 220-M to execute the section-wise backup operation in reverse (from a location at the DMS 210 to a location at the Mth computing system 205-M associated with the Mth data object 220-M). The pe-duplication script may trigger the Mth data object 220-M to back up a first subset of files of point-in-time data recreated at the DMS 210 for the first computing system 205-1 to the location at the Mth computing system 205-M.

As a second phase of the duplication procedure, the first DMS agent 215-1 may execute a duplication script that triggers the first data object 220-1 to execute a native duplication operation that duplicates a second subset of files (excluding the pre-restored files) to the location at the Mth computing system 205-M. The duplication procedure is described in more detail herein, including with reference to FIGS. 4 and 5.

Figure 3:
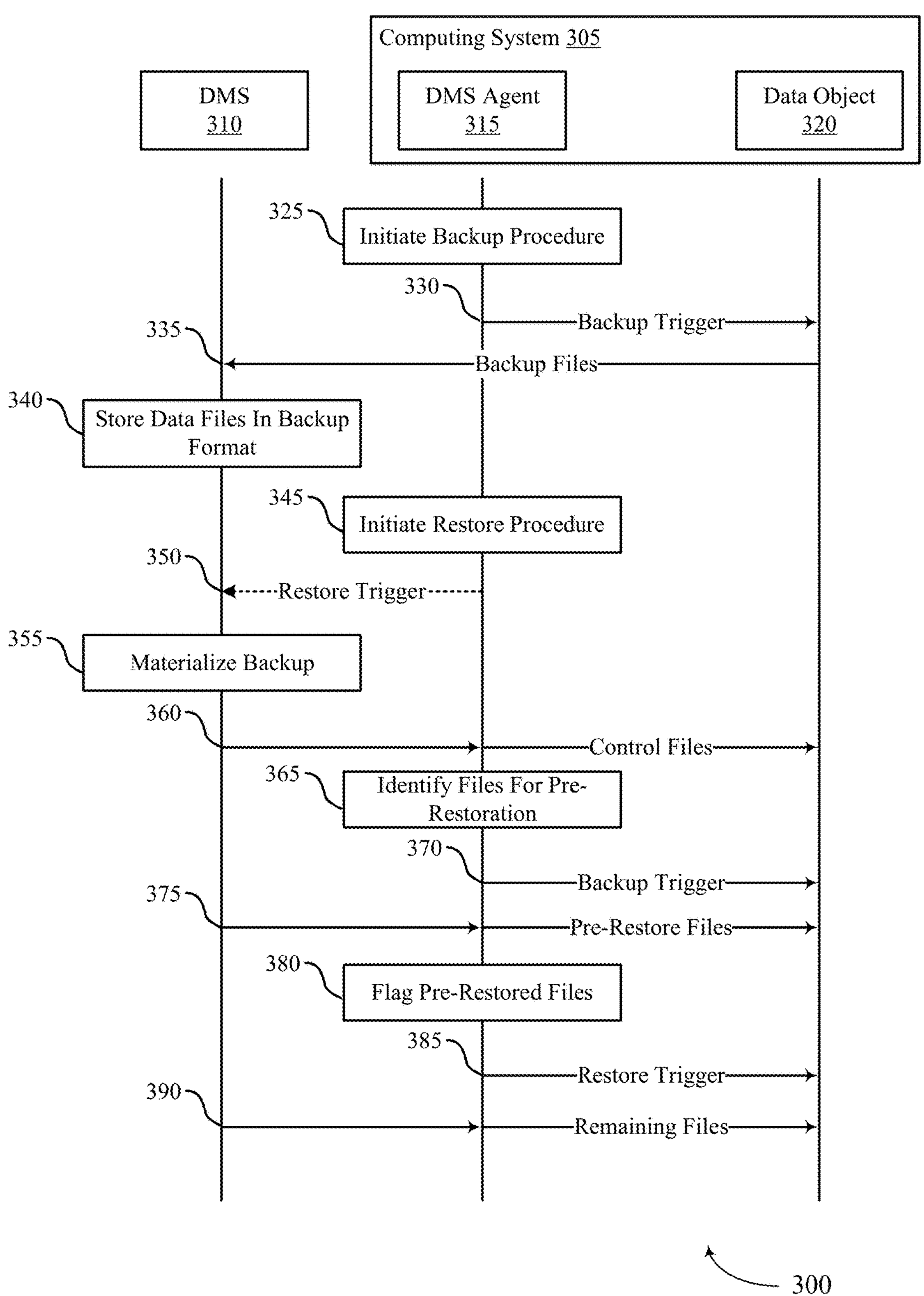
FIG. 3 shows an example of a set of operations that supports preliminary processing for management of data objects in accordance with aspects of the present disclosure.

FIG. 3 shows an example of a set of operations that supports preliminary processing for management of data objects in accordance with aspects of the present disclosure. The process flow 300 may be performed by the DMS 310, the DMS agent 315, and the data object 320, which may be respective examples of a DMS (e.g., the DMS 110 of FIG. 1, the DMS 210 of FIG. 2), a DMS agent (e.g., the DMS agent 215 of FIG. 2), and a data object (e.g., the one or more data objects 220 of FIG. 2) described herein. The computing system 305 may be an example of a computing system (e.g., the computing system 105 of FIG. 1, the one or more computing systems 205 of FIG. 2). described herein. In some examples, the process flow 300 illustrates an example set of operations performed to support preliminary processing for management of data objects. For example, the process flow 300 may include operations for performing a two-part restoration procedure that includes a pre-restoration operation and a standard restoration operation.

At reference 325, a backup procedure may be initiated (e.g., by the DMS agent 315) for the data object 320. In some examples, the backup procedure is initiated in accordance with a backup schedule for the data object 320. In some examples, the initiated backup procedure is a full backup procedure used to fully back up the data object 320. In other examples, the initiated backup procedure is an incremental backup procedure used to incrementally back up the data object 320 (e.g., relative to an earlier—in time full backup procedure).

At reference 330, a backup operation of the data object 320 may be triggered (e.g., by the DMS agent 315). The backup operation triggered by the DMS agent 315 may be a section-wise image backup operation that is native to the data object 320. A message for triggering the backup operation may include an indication of a target location at the DMS 310 for the data object 320 to back up its data.

At reference 335, files of the data object 320 may be backed up to the DMS 310. In some examples, files of the data object 320 may be backed up to the DMS 310 in a native format of the data object 320 (e.g., in the same formats with which the files are stored at the data object 320). If the backup procedure is a full backup procedure, all of the files of the data object 320 may be backed up to the DMS 310. If the backup procedure is an incremental backup procedure, a portion of the files of the data object 320 (e.g., those that have changed or been added) may be backed up to the DMS 310.

One or more of the files of the data object 320 may qualify as very large files (e.g., based on being larger than a threshold size, such as a 50-gigabyte threshold). In some examples, the backup operation executed by the data object 320 may be configured to divide the one or more very large files into sections and transfer the sections of the very large files to the DMS 310 on a per-section basis and in parallel (e.g., using multiple computing threads).

Additionally, or alternatively, one or more of the files of the data object 320 may be selected by a user for section-wise backup, and the data object 320 may divide the one or more user-selected files into sections and transfer the sections of the user-selected files to the DMS 310 on a per-section basis and in parallel. Additionally, or alternatively, one or more of the files of the data object 320 may be of a particular type, and the data object 320 may divide the one or more files of the particular type into sections and transfer the sections of the files of the particular type to the DMS 310 on a per-section basis and in parallel.

In some examples, a recovery manager (e.g., RMAN) at the data object 320 may manage the backup process of the files of the data object 320 to the DMS 310. In some examples, the recovery manager uses a set of RMAN channels for backing up the files of the data object to the DMS 310. In some examples, the files of the DMS 310 may be backed up to different directories based on the quantity of activated RMAN channels—e.g., if four RMAN channels are activated, the recovery manager may back up the files to four different directories at the DMS 310. In some examples, the recovery manager is configured to restore the files of the data object in accordance with the directories generated during the backup procedure.

At reference 340, the DMS 310 may store the transferred files of the data object 320 in a backup format (e.g., in an image backup or snapshot format). If the backup procedure is a full backup procedure, the DMS 310 may store the files of the data object 320 in a full backup format. If the backup procedure is an incremental backup procedure, the DMS 310 may store files of the data object 320 in an incremental backup format. In some examples, the data object 320 may be fully restored to one of many points-in-time based on one or more full backups and one or more incremental backups stored at the DMS 310 for the data object 320.

At reference 345, a restoration procedure may be initiated (e.g., by the DMS agent 315). In some examples, the restoration procedure is initiated in response to a request from a customer to restore the data object 320 to a desired point-in-time. In some examples, the restoration procedure is initiated in response to a request from a customer to restore a different instance of the data object 320 (e.g., at the computing system 305) to the desired point-in-time. In some examples, the restoration procedure is initiated in response to a request from a customer to restore the data object 320 to a desired point-in-time using backup data for a different data object (e.g., a different data object located at the computing system 305 or at a different computing system).

At reference 350, the restoration procedure may be triggered (e.g., by the DMS agent 315) at the DMS 310—e.g., if the restoration request is received at the computing system 305.

At reference 355, files (e.g., all of the files or a subset of files to be restored) of the data object 320 at the desired point-in-time may be materialized (e.g., recreated) at the DMS 310. The materialized files of the data object 320 may be stored at the DMS 310 such that the materialized files are mountable by the computing system 305—e.g., as a network drive.

At reference 360, based on mounting the materialized files, control files for the data object 320 may be overwritten (e.g., via the DMS agent 315) using the control files recreated in the materialized files. The control files may include files that support the functioning of the data object 320 (e.g., operation-level files, configuration files).

In some examples, a new instance of the data object 320 may be instantiated and the control files may be written to the new instance of the data object 320 at the computing system 305.

At reference 365, first files to be restored to the data object 320 (or the new instance of the data object 320) during a first phase (which may be referred to as the pre-restoration phase) of the restoration procedure may be identified. In some examples, the first files may be files that are larger than a threshold size (e.g., larger than 50 gigabytes). Additionally, or alternatively, the first files may be files selected by a user. Additionally, or alternatively, the first files may be files of a particular file type.

At reference 370, as part of the pre-restoration phase, a backup operation of the data object 320 may be triggered (e.g., by the DMS agent 315). The backup operation may be a section-wise image backup operation that is native to the data object 320. A message for triggering the backup operation may include an indication of the first files, a source location (which may point to a network drive at the computing system 305 and that exposes a corresponding location of the DMS 310), and a target location at the computing system 305 (where the target location may be associated with a location at the computing system 305 allocated to the data object 320 or to a new instance of the data object 320).

In some examples, the first files may be restored based on the DMS agent 315 executing a script that causes the data object 320 (or the new instance of the data object 320) to perform the section-wise image backup operation in reverse. That is, the DMS agent 315 may execute a script that cause the data object 320 to backup sections of the mounted first files to the data object 320 (or the new instance of the data object 320) on a per-section basis and in parallel. In some examples, the DMS agent 315 indicates a location within the computing system 305 that stores the files of the data object 320 (or the new instance of the data object 320) as a target location for the backup.

At reference 375, the first files may be backed up (e.g., via the DMS agent 315) from the DMS 310 to the data object 320 (or the new instance of the data object 320) during the pre-restoration phase on a per-section basis and in parallel. Using a section-wise backup procedure of the data object 320 to transfer the first files during a pre-restoration phase may enable certain files (e.g., very large files) to be transferred from the DMS 310 to the data object 320 (or the new instance of the data object 320) with less latency than on a per-file basis, while leveraging a native operation of the data object 320.

At reference 380, the pre-restored first files may be flagged (e.g., by the DMS agent 315) for a second phase (which may be referred to as the restoration phase) of the restoration procedure. Based on flagging the first files, the second phase of the restoration procedure may avoid transferring the first files to the data object 320 (or the new instance of the data object 320) as part of the second phase.

At reference 385, as part of the restoration phase of the restoration procedure, a restoration operation of the data object 320 (or the new instance of the data object 320) may be triggered (e.g., by the DMS agent 315). The restoration operation may be a file-wise restoration operation that is native to the data object 320. A message for triggering the restoration operation may include an indication of a source location at the DMS 310 from which to restore the data. Also, the data object 320 (or the new instance of the data object 320) may naturally restore the files to a location at the computing system 305 allocated to the data object 320 (or the new instance of the data object 320) in accordance with the native file-wise restoration operation.

At reference 390, the remaining files may be restored (e.g., via the DMS agent 315) to the data object 320 (or the new instance of the data object 320). In some examples, the first files may be restored based on the DMS agent 315 executing a script that causes the data object 320 (or the new instance of the data object 320) to perform a native, file-wise restoration operation for the remaining files.

In some examples, the process for the DMS agent 315 to perform the restoration procedure may include a first operation for creating an instance of the data object 320 (e.g., using a dummy configuration file, such as an Oracle PFILE). Next, a second operation may be used to restore an actual configuration file (e.g., an Oracle SPFILE) at the DMS 310. In a third operation, the instance of the data object 320 may be initiated using the restored configuration file. After initiating the instance of the data object 320, control files for the data object 320 may be restored. After restoring the control files, the instance of the data object 320 may use the control files to create base directories for the instance of the data object 320. Based on creating the base directories, the data files names for the instance of the data object 320 may be determined and a mapping between a data file number of the data files and an output file format may be determined.

After mapping the data files, the DMS agent 315 may execute, during a pre-restoration phase of the restoration procedure, a script to cause the new instance of the data object 320 to perform a section-wise image backup operation of a first files of the data files from the DMS 310 to a location of the computing system 305 that stores the files of the new instance of the data object 320. After the section-wise image backup operation completes, the DMS agent 315 may query the new instance of the data object 320 to obtain the complete path of the restored first files and may construct a second mapping between the data file numbers of the first files and the absolute restored file path.

The DMS agent 315 may identify the pre-restored first files based on the second mapping and may execute, during a restoration phase of the restoration procedure, a script to cause the new instance of the data object 320 to perform a file-wise restoration operation for second files (excluding the pre-restored first files). After completing the restoration of the second files, the DMS agent 315 may run post-restoration scripts—e.g., to clean up any extraneous data, launch the new instance of the data object 320.

Although described in the context of restoring backup data of the data object 320 to the data object 320 or to a new instance of the data object 320 at the computing system 305, similar operations may be performed to restore backup data of the data object 320 to a data object at a different computing system (e.g., via a different DMS agent).

Aspects of the process flow 300 may be implemented by a controller, among other components. Additionally, or alternatively, aspects of the process flow 300 may be implemented as instructions stored in memory (e.g., firmware stored in a memory coupled with a controller). For example, the instructions, when executed by a controller, may cause the controller to perform the operations of the process flow 300.

One or more of the operations described in the process flow 300 may be performed earlier or later, omitted, replaced, supplemented, or combined with another operation. Also, additional operations described herein may replace, supplement or be combined with one or more of the operations described in the process flow 300.

Figure 4:
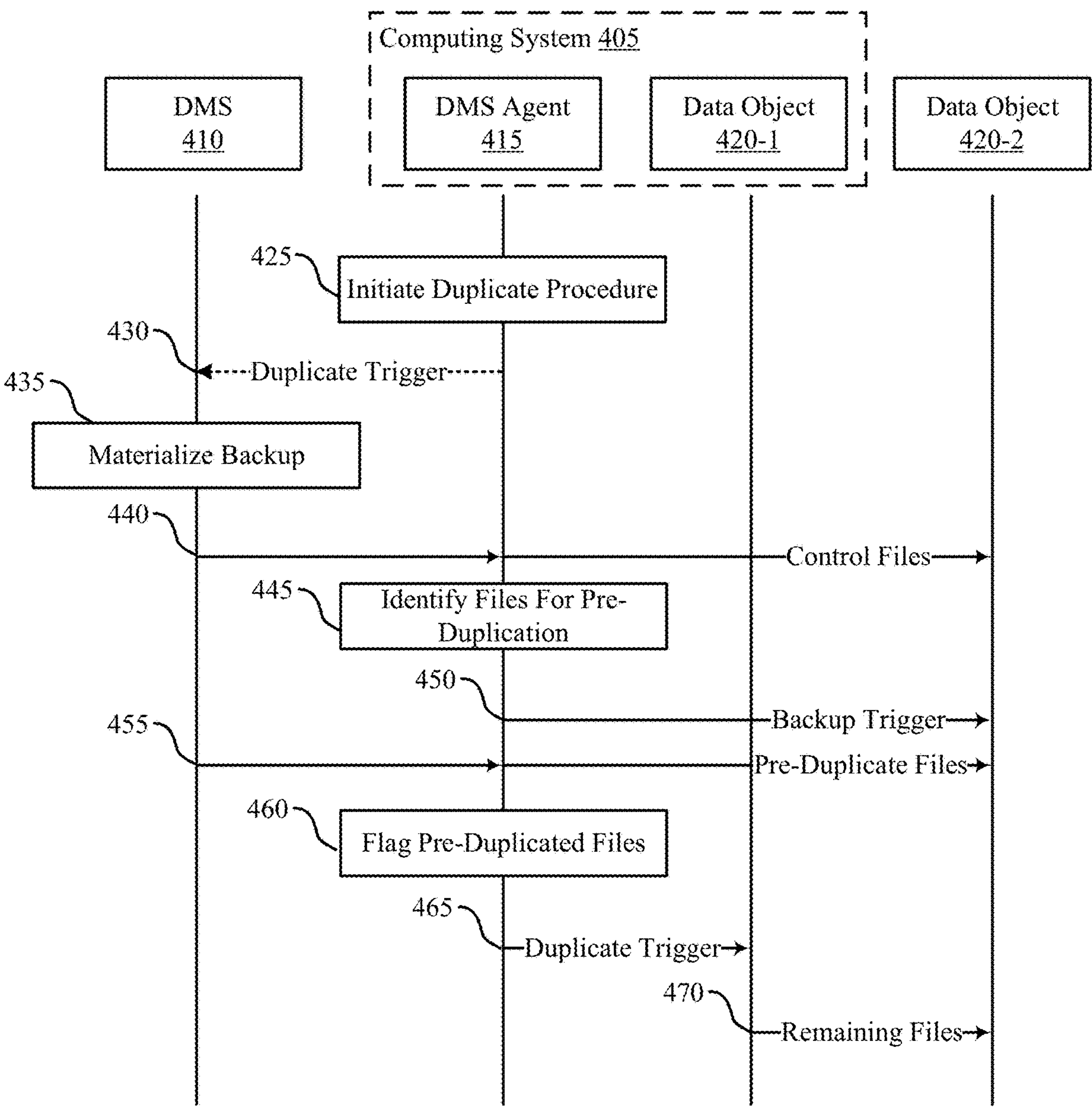
FIG. 4 shows an example of a set of operations that supports preliminary processing for management of data objects in accordance with aspects of the present disclosure.

FIG. 4 shows an example of a set of operations that supports preliminary processing for management of data objects in accordance with aspects of the present disclosure.

The process flow 400 may be performed by the DMS 410, the DMS agent 415, and the data objects 420, which may be respective examples of a DMS (e.g., the DMS 110 of FIG. 1, the DMS 210 of FIG. 2, the DMS 310 of FIG. 3), a DMS agent (e.g., the DMS agent 215 of FIG. 2, the DMS agent 315 of FIG. 3), and a data object (e.g., the one or more data objects 220 of FIG. 2, the data object 320 of FIG. 3) described herein. The computing system 405 may be an example of a computing system (e.g., the computing system 105 of FIG. 1, the one or more computing systems 205 of FIG. 2, the computing system 305 of FIG. 3) described herein. The second data object 420-2 may be located within the computing system 405 or within a different computing system.

In some examples, the process flow 400 illustrates an example set of operations performed to support preliminary processing for management of data objects. For example, the process flow 400 may include operations for performing a two-part duplication procedure that includes a pre-duplication operation and a standard duplication operation.

At reference 425, a duplication procedure may be initiated (e.g., by the DMS agent 415, by the DMS 410) for the first data object 420-1 to the second data object 420-2. In some examples, the duplication procedure is initiated in response to a request from a customer to duplicate the first data object 420-1 to the second data object 420-2.

At reference 430, a duplication procedure for the first data object 420-1 may be triggered (e.g., by the DMS agent 415) at the DMS 410—e.g., if the restoration procedure is received at the computing system 405. A message for triggering the duplication operation may include an identity of the first data object 420-1 as a source object and the second data object 420-2 as the target object.

At reference 435, backup files for the first data object 420-1 may be materialized at a desired point-in-time (e.g., a latest point-in-time captured for the first data object 420-1). In some examples, the backup files are generated for the first data object as similarly described herein, including with reference to the operations described at reference 325 through reference 340 of FIG. 3. In some examples, the backup files for the first data object 420-1 are generated in response to the duplication procedure being initiated. The materialized files of the first data object 420-1 may be stored at the DMS 410 such that the materialized files are mountable by a computing system—e.g., as a network drive.

At reference 440, based on mounting the materialized files, control files for the first data object 420-1 may be written to the second data object 420-2. If the second data object 420-2 is located within the computing system 405, the DMS agent 415 may write the control files to a location within the computing system 405 allocated to the second data object 420-2. If the second data object 420-2 is located within a different computing system, a different DMS agent at the second computing system may write the control files to a location within the second computing system allocated to the second data object 420-2.

At reference 445, first files to be duplicated to the second data object 420-2 during a first phase (which may be referred to as the pre-duplication phase) of the duplication procedure may be identified. In some examples, the first files may be files that are larger than a threshold size (e.g., larger than 50 gigabytes). Additionally, or alternatively, the first files may be files selected by a user. Additionally, or alternatively, the first files may be files of a particular file type.

At reference 450, as part of the pre-duplication phase, a backup operation of the second data object 420-2 may be triggered (e.g., by the DMS agent 415 or the different DMS agent if the second data object 420-2 is located at a second computing system). The backup operation may be a section-wise image backup operation that is native to the second data object 420-2. A message for triggering the backup operation may include an indication of the first files, a source location (which may point to a network drive at the computing system that includes the second data object 420-2 and that exposes a corresponding location of the DMS 410), and a target location at the computing system that includes the second data object 420-2 (where the target location may be associated with a location at the computing system allocated to the second data object 420-2).

In some examples, the first files may be duplicated based on the DMS agent 415 (or the other DMS agent if the second data object 420-2 is located at a different computing system) executing a script that causes the second data object 420-2 to perform a section-wise image backup operation in reverse. That is, the relevant DMS agent may execute a script that causes the second data object 420-2 to backup sections of the mounted first files to the second data object 420-2 on a per-section basis and in parallel. In some examples, the relevant DMS agent indicates a location within the relevant computing system that stores the files of the second data object 420-2 as a target location for the backup.

At reference 455, the first files may be duplicated (e.g., via the DMS agent 415) to the second data object 420-2 during the pre-duplication phase. Using a section-wise backup procedure of the second data object 420-2 to transfer the first files during a pre-duplication phase may enable certain files (e.g., very large files) to be transferred from the DMS 410 to the second data object 420-2 with less latency than on a per-file basis, while leveraging a native operation of the second data object 420-2.

Copying the first files during the pre-duplication phase may include modifying aspects of the first files to be consistent with the second data object 420-2—e.g., to be consistent with a name of the second data object 420-2, to be consistent with a file path associated with the second data object 420-2, etc.

At reference 460, the pre-duplicated first files may be flagged (e.g., by the DMS agent 415) for a second phase (which may be referred to as the duplication phase) of the duplication procedure. Based on flagging the first files, the second phase of the duplication procedure may avoid transferring the first files to the second data object 420-2 as part of the second phase.

At reference 465, as part of the duplication phase of the duplication procedure, a duplication operation of the first data object 420-1 may be triggered (e.g., by the DMS agent 415). The duplication operation may be a file-wise duplication operation that is native to the first data object 420-1. A message for triggering the duplication operation may include an indication of a target location associated with the second data object 420-2 to which to duplicate the data.

At reference 470, the remaining files may be duplicated from the first data object 420-1 to the second data object 420-2. In some examples, the first files may be duplicated based on the DMS agent 415 executing a script that causes the first data object 420-1 to perform a native, file-wise duplication operation for the remaining files to the second data object 420-2.

In some examples, the process for the DMS agent 415 to perform the duplication procedure may include a first operation for creating an instance of the second data object 420-2 (e.g., using a dummy configuration file, such as an Oracle PFILE). Next, a second operation may be used to restore an actual configuration file (e.g., an Oracle SPFILE) at the DMS 410. In a third operation, the instance of the second data object 420-2 may be initiated using the restored configuration file. After initiating the instance of the second data object 420-2, control files for the second data object 420-2 may be restored. After restoring the control files, the instance of the second data object 420-2 may use the control files to create base directories for the instance of the second data object 420-2. Based on creating the base directories, the data files names for the instance of the second data object 420-2 may be determined and a mapping between a data file number of the data files and an output file format may be determined.

After mapping the data files, the DMS agent 415 may execute, during a pre-duplication phase of the duplication procedure, a script to cause the instance of the second data object 420-2 to perform a section-wise image backup operation of a first files of the data files from the DMS 410 to a location of the computing system 405 (or another computing system) that stores the files of the instance of the second data object 420-2. After the section-wise image backup operation completes, the instance of the second data object 420-2 may be queried to obtain the complete path of the duplicated first files and a second mapping between the data file numbers of the first files and the absolute duplicated file path may be constructed. The instance of the second data object 420-2 may then be shut down and restarted in a no mounting mode.

The DMS agent 415 may identify the pre-duplicated first files based on the second mapping and may execute, during a duplication phase of the duplication procedure, a script to cause the first data object 420-1 to perform a file-wise duplication operation for second files (excluding the pre-duplicated first files). After completing the duplication of the second files, the DMS agent 415 may run post-duplication scripts—e.g., to clean up any extraneous data, launch the instance of the second data object 420-2.

Aspects of the process flow 400 may be implemented by a controller, among other components. Additionally, or alternatively, aspects of the process flow 400 may be implemented as instructions stored in memory (e.g., firmware stored in a memory coupled with a controller). For example, the instructions, when executed by a controller, may cause the controller to perform the operations of the process flow 400.

One or more of the operations described in the process flow 400 may be performed earlier or later, omitted, replaced, supplemented, or combined with another operation. Also, additional operations described herein may replace, supplement or be combined with one or more of the operations described in the process flow 400.

Figure 5:
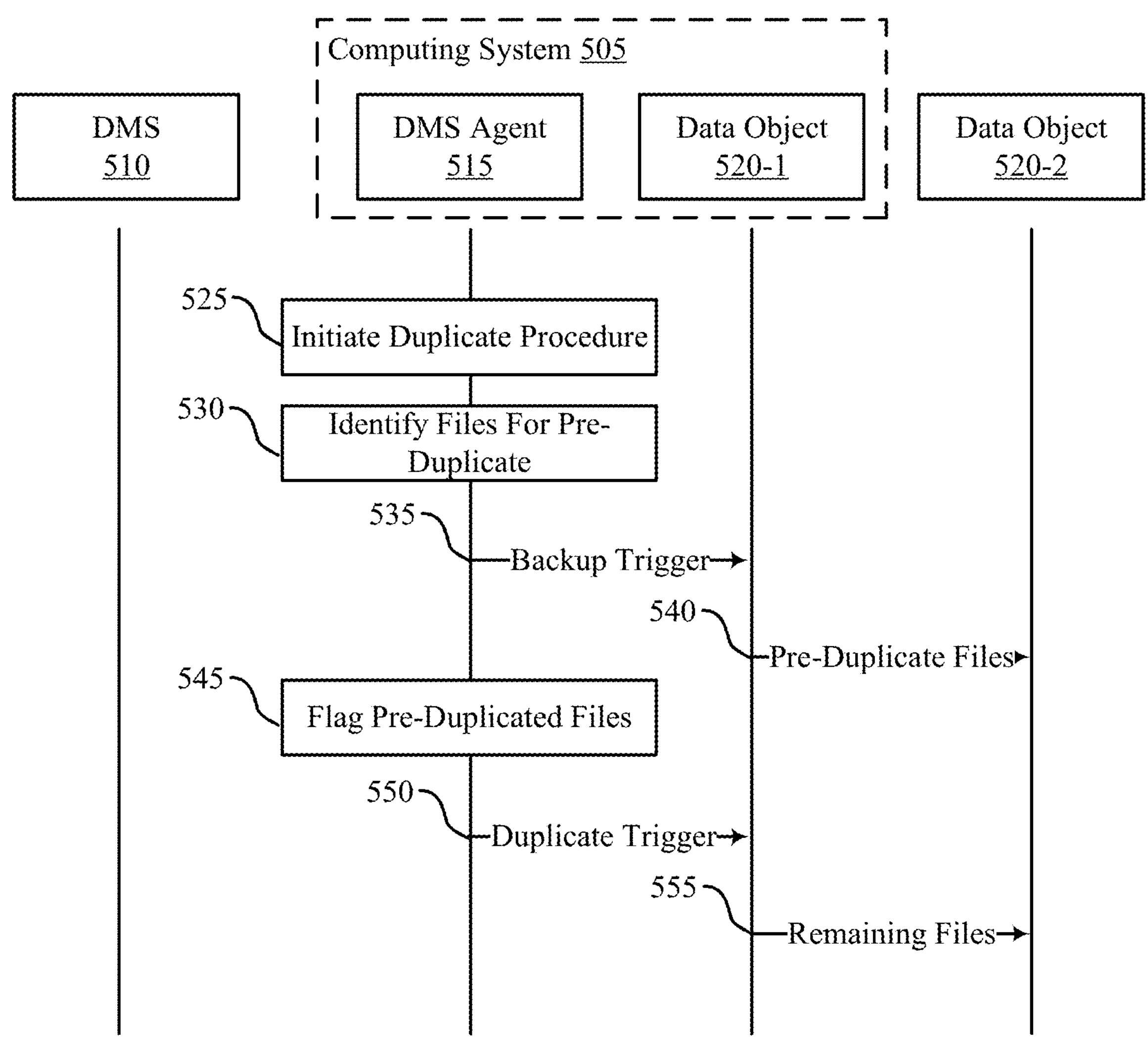
FIG. 5 shows an example of a set of operations that supports preliminary processing for management of data objects in accordance with aspects of the present disclosure.

FIG. 5 shows an example of a set of operations that supports preliminary processing for management of data objects in accordance with aspects of the present disclosure.

The process flow 500 may be performed by the DMS 510, the DMS agent 515, and the data objects 520, which may be respective examples of a DMS (e.g., the DMS 110 of FIG. 1, the DMS 210 of FIG. 2, the DMS 310 of FIG. 3, the DMS 410 of FIG. 4), a DMS agent (e.g., the DMS agent 215 of FIG. 2, the DMS agent 315 of FIG. 3, the DMS agent 415 of FIG. 4), and a data object (e.g., the one or more data objects 220 of FIG. 2, the data object 320 of FIG. 3, the data objects 420 of FIG. 4) described herein. The computing system 505 may be an example of a computing system (e.g., the computing system 105 of FIG. 1, the one or more computing systems 205 of FIG. 2, the computing system 305 of FIG. 3, the computing system 405 of FIG. 4) described herein. The second data object 520-2 may be located within the computing system 505 or within a different computing system.

In some examples, the process flow 500 illustrates an example set of operations performed to support preliminary processing for management of data objects. For example, the process flow 500 may include operations for performing a two-part duplication procedure that includes a pre-duplication operation and a standard duplication operation.

At reference 525, a duplication procedure may be initiated (e.g., by the DMS agent 515) for the first data object 520-1 to the second data object 520-2, as similarly described herein and with reference to the operations described at reference 425 of FIG. 4.

At reference 530, first files to be duplicated to the second data object 520-2 during a first phase (which may be referred to as the pre-duplication phase) of the duplication procedure may be identified, as similarly described herein and with reference to the operations described at reference 445 of FIG. 4.

At reference 535, as part of the pre-duplication phase, a backup operation of the first data object 520-1 may be triggered (e.g., by the DMS agent 515). The backup operation may be a section-wise image backup operation that is native to the first data object 520-1. A message for triggering the backup operation may include an indication of the first files and a target location at a computing system that includes the second data object 520-2 (where the target location may be associated with a location at the computing system allocated to the second data object 520-2).

In some examples, the first files may be duplicated based on the DMS agent 515 executing a script that causes the first data object 520-1 to perform a section-wise image backup operation to a location at a relevant computing system allocated to the second data object 520-2. That is, the DMS agent 515 may execute a script that cause the first data object 520-1 to backup the first files to the second data object 520-2 on a per-section basis and in parallel. In some examples, the DMS agent 515 indicates a location within the relevant computing system that stores the files of the second data object 520-2 as a target location for the backup.

At reference 540, the first files may be duplicated (e.g., via the DMS agent 515 or a different DMS agent) to the second data object 520-2 during the pre-duplication phase. Using a section-wise backup procedure of the second data object 520-2 to transfer the first files during a pre-duplication phase may enable certain files (e.g., very large files) to be transferred from the first data object 520-1 to the second data object 520-2 with less latency than on a per-file basis, while leveraging a native operation of the first data object 520-1.

Copying the first files during the pre-duplication phase may include modifying aspects of the first files to be consistent with the second data object 520-2—e.g., to be consistent with a name of the second data object 520-2, to be consistent with a file path associated with the second data object 520-2, etc.

At reference 545, the pre-duplicated first files may be flagged (e.g., by the DMS agent 515) for a second phase (which may be referred to as the duplication phase) of the duplication procedure, as similarly described herein and with reference to the operations described at reference 460 of FIG. 4.

At reference 550, as part of the duplication phase of the duplication procedure, a duplication operation of the first data object 520-1 may be triggered (e.g., by the DMS agent 515), as similarly described herein and with reference to the operations described at reference 465 of FIG. 4.

At reference 555, the remaining files may be duplicated from the first data object 520-1 to the second data object 520-2, as similarly described herein and with reference to the operations described at reference 470 of FIG. 4.

Aspects of the process flow 500 may be implemented by a controller, among other components. Additionally, or alternatively, aspects of the process flow 500 may be implemented as instructions stored in memory (e.g., firmware stored in a memory coupled with a controller). For example, the instructions, when executed by a controller, may cause the controller to perform the operations of the process flow 500.

One or more of the operations described in the process flow 500 may be performed earlier or later, omitted, replaced, supplemented, or combined with another operation. Also, additional operations described herein may replace, supplement or be combined with one or more of the operations described in the process flow 500.

Figure 6:
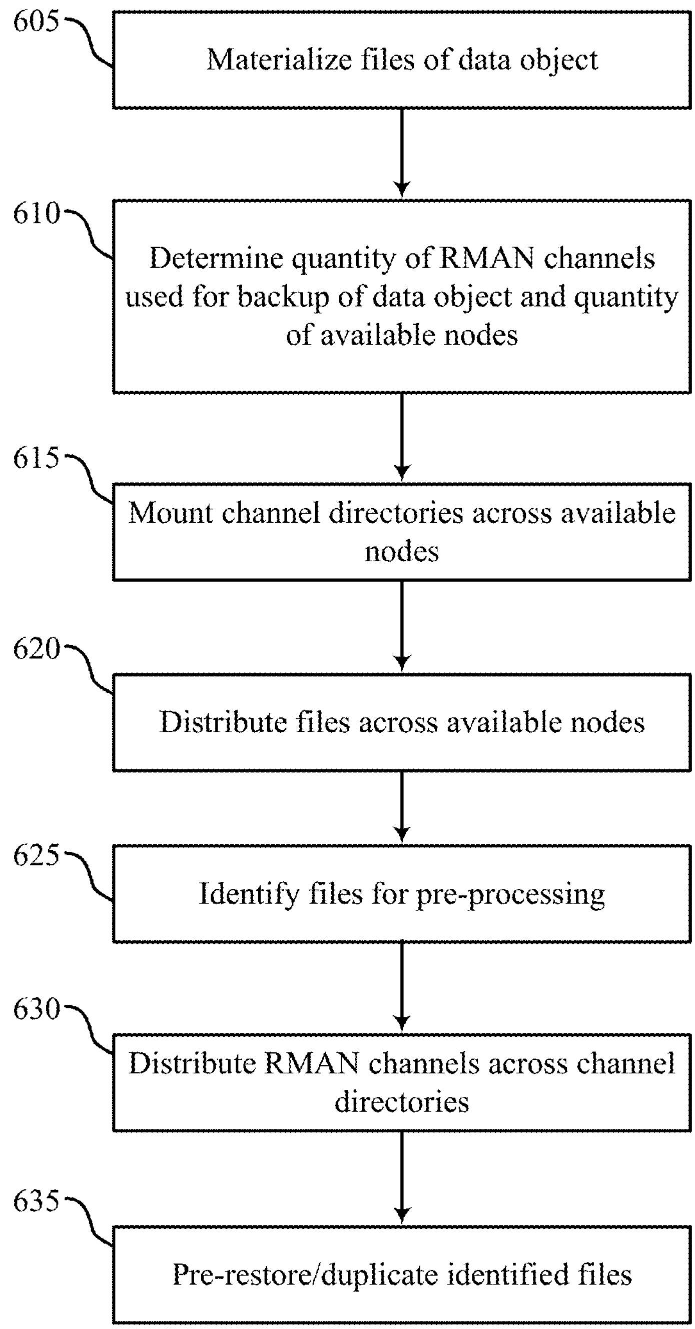
FIG. 6 shows an example of a set of operations that supports preliminary processing for management of data objects in accordance with aspects of the present disclosure.

FIG. 6 shows a set of operations that supports preliminary processing for management of data objects in accordance with aspects of the present disclosure.

The flowchart 600 may be performed by a DMS (e.g., the DMS 110 of FIG. 1, the DMS 210 of FIG. 2, the DMS 310 of FIG. 3, the DMS 410 of FIG. 4, the DMS 510 of FIG. 5) described herein. In some examples, the flowchart 600 may be performed in combination with other operations described herein (e.g., in combination with the sets of operations described in FIGS. 3 through 5). For example, the operations described in the flowchart 600 may be performed prior to or as part of the operations for pre-restoring described at reference 375 of FIG. 3 or pre-duplicating files described at reference 455 of FIG. 4.

At reference 605, files of a data object may be materialized from backup files stored at the DMS. In some examples, the files of the data object may be materialized for a data management (e.g., restoration procedure or a duplication) procedure. In some examples, the files of the data object may be restored in accordance with a set of directories generated by the data object during a backup operation performed by the data object. For example, if four RMAN channels were used during the backup operation to back up the files, then the files may be restored in accordance with four corresponding channel directories (which may be referred to as cdir0 to cdir3). In some examples, each RMAN channel may support backup of a file or section of a file—e.g., four RMAN channels may support the parallel backup of four files or sections of files. It is to be understood that these and any other specific numbers are examples only and are used only in the interest of more clearly explaining various aspects of the disclosure, and such specific numbers are not in any way limiting of the claims unless specifically recited within the claims.

At reference 610, a quantity of RMAN channels used to back up the data object and a quantity of available nodes at the DMS for the data management procedure operation may be determined. For example, if the backup files are restored to four directories, it may be determined that four RMAN channels were used to back up the data object four. In some examples, the quantity of nodes at the DMS and the quantity of RMAN channels that are available to support the data management procedure may be different than the quantity of RMAN channels used to back up the data object and may similarly be different than the quantity of generated directories).

In such cases, if a native restoration procedure for the data object were used, the data object may use the same quantity of channel directories (e.g., four) to restore the materialized files as were used to back up the materialized files, regardless of a quantity of available RMAN channels or nodes at the time the data management procedure is initiated. In such cases (e.g., if there are eight RMAN channels), a subset of the available RMAN channels may go unused. That is, since the native restoration procedure may restore the files sequentially, a single RMAN channel may be used for each of the four channel directory.

However, by having the DMS orchestrate the data management procedure (via a DMS agent), the DMS may use a larger quantity of channel directories to execute the data management procedure than were used for the backup procedure. For example, if four RMAN channels were used for backup (resulting in four channel directories) but eight RMAN channels and eight nodes are available for the data management procedure, the DMS may instead distribute the materialized files across eight channel directories (cdir0 to cdir7) at eight mounting points, which may increase an amount of network bandwidth available for and reduce a latency of the data management procedure. In another example, if four RMAN channels were used for backup but eight RMAN channels and six nodes are available for the data management procedure, the DMS may instead distribute the materialized files across six channel directories (cdir0 to cdir5) and six mounting points, and so on.

At reference 615, the channel directories may be mounted based on identifying the quantity of RMAN channels and nodes available. For example, if eight RMAN channels and eight nodes are available for the data management procedure, the DMS may mount eight channel directories (cdir0 to cdir7). If twelve RMAN channels and eight nodes are available for the data management procedure, the DMS may mount eight channel directories (cdir0 to cdir7) and so on.

At reference 620, the materialized files may be distributed amongst the channel directories mounted across the available nodes of the DMS. For example, if four channel directories are mounted (e.g., in an example where two RMAN channels and two channel directories were used for backup), then the materialized files may be distributed amongst the four channel directories.

In some examples, the materialized files are distributed across the four channel directories in accordance with a size of the materialized files an algorithm that allocates the materialized files to the channel directory having the least amount of data allocated—e.g., as indicated in the following table.

| | | Distribution of files after the iteration | | | |
|---|---|---|---|---|---|
| Iteration | Files (GB) | cdir0 | cdir1 | cdir2 | cdir3 |
| 1 | 9, 6, 6, 6, 6, 4, 4, 3, 3 | 9 | | | |
| 2 | 9, 6, 6, 6, 6, 4, 4, 3, 3 | 9 | 6 | | |
| 3 | 9, 6, 6, 6, 6, 4, 4, 3, 3 | 9 | 6 | 6 | |
| 4 | 9, 6, 6, 6, 6, 4, 4, 3, 3 | 9 | 6 | 6 | 6 |
| 5 | 9, 6, 6, 6, 6, 4, 4, 3, 3 | 9 | 6, 6 | 6 | 6 |
| 6 | 9, 6, 6, 6, 6, 4, 4, 3, 3 | 9 | 6, 6 | 6, 4 | 6 |
| 7 | 9, 6, 6, 6, 6, 4, 4, 3, 3 | 9 | 6, 6 | 6, 4 | 6, 4 |
| 8 | 9, 6, 6, 6, 6, 4, 4, 3, 3 | 9, 3 | 6, 6 | 6, 4 | 6, 4 |
| 9 | 9, 6, 6, 6, 6, 4, 4, 3, 3 | 9, 3 | 6, 6 | 6, 4, 3 | 6, 4 |

At reference 625, first files of the materialized files that are eligible for a pre-processing operation (e.g., a pre-restoration or pre-duplication operation) may be identified. For example, files of the materialized files that are greater than a certain size, are of a certain type, or have been selected by a user may be identified. As such an example, a thirty-five (35) terabyte file may be identified within a first channel directory mounted at a first node, a two (2) terabyte file may be identified within a second channel directory mounted at a second node, a three (3) terabyte file may be identified within a third channel directory mounted at a third node, and an eight (8) terabyte file may be identified within a fourth channel directory mounted at a fourth node. As another such example, a thirty-five (35) terabyte file may be identified within a first channel directory mounted at a first node, a two (2) terabyte file may be identified within a second channel directory mounted at a second node, three one-and-a-half (1.5) terabyte files may be identified within a third channel directory mounted at a third node, and four two (2) terabyte files may be identified within a fourth channel directory mounted at a fourth node.

At reference 630, an allocation of the available RMAN channels to the available nodes/mounting points may be determined. In some examples, the available RMAN channels are allocated based on a percentage of the data allocated to the different nodes/channel directories. For example, if a first channel directory is allocated 10% of the data of the first files, then 10% of the available RMAN channels may be allocated to the first channel directory. For example, if there are twenty RMAN channels available, then two of the RMAN channels may be allocated to the first channel directory.

In some examples, the first files may be distributed (in accordance with the earlier distribution operation) across a set of channel directories (e.g., four channel directories corresponding to four nodes) as indicated in the example of the following table—e.g., an example where the data object includes a single 35 terabyte file that is allocated to the first directory during the initial distribution.

| cdir0 | cdir1 | cdir2 | cdir3 |
|---|---|---|---|
| 35 Terabyte | 2 Terabyte | 3 Terabyte | 8 Terabyte |

Based on the distribution, the percentage of data allocated to the different channel directories for a pre-processing procedure may be determined. For example, if 48 terabytes of data is to be restored, then the weights for the different channel directories may be calculated as indicated in the following table.

| cdir0 | cdir1 | cdir2 | cdir3 |
|---|---|---|---|
| 72.9% | 4.17% | 6.25% | 16.67% |

With these above weights, an allocation of the available RMAN channels (e.g., 32 RMAN channels) to the different channel directories may be determined as indicated in the following table.

| cdir0 | cdir1 | cdir2 | cdir3 |
|---|---|---|---|
| 24 | 1 | 2 | 5 |

In some examples, a single section-wise backup script may be generated for each channel directory to back up the sections of the first files.

In some examples, an independent section size is calculated for each of the first files being restored—e.g., based on the parallelism available (the number of RMAN channels available) for the section-wise backup of a first file. For example, if there is a ten terabyte file and the parallelism is two, then a section size of five terabytes may be used. However, if there is a parallelism of eight, then a section size of one-and-a-quarter (1.25) terabytes may be used.

At reference 635, the first files may be transferred to the data object, a new instance of the data object, or a different deployment of the data object—e.g., during a pre-restoration operation, during a pre-duplication operation. In such cases, sections of the first files may be backed up to the target location in accordance with the mounted channel directories and allocated RMAN channels.

In some examples, if the materialized files include a few large files (e.g., two large files that are 10 terabyte each), then a pre-processing procedure may include restoring (using a per-section backup operation) the first large file first with all of the available RMAN channels and then backing-up/restoring the second files with all of the available RMAN channels.

In other examples, the pre-processing procedure may include restoring (using a per-section backup operation) the first large file with a subset (e.g., half) of the available channels and restoring the second large file with another subset (e.g., half) of the available channels in parallel. The second option may be based on the distribution of the RMAN channels to the mounted channel directories and may enable the network bandwidth of multiple nodes (mounting respective channel directories) to be utilized.

Aspects of the flowchart 600 may be implemented by a controller, among other components. Additionally, or alternatively, aspects of the flowchart 600 may be implemented as instructions stored in memory (e.g., firmware stored in a memory coupled with a controller). For example, the instructions, when executed by a controller, may cause the controller to perform the operations of the flowchart 600.

One or more of the operations described in the flowchart 600 may be performed earlier or later, omitted, replaced, supplemented, or combined with another operation. Also, additional operations described herein may replace, supplement or be combined with one or more of the operations described in the flowchart 600.

Figure 7:
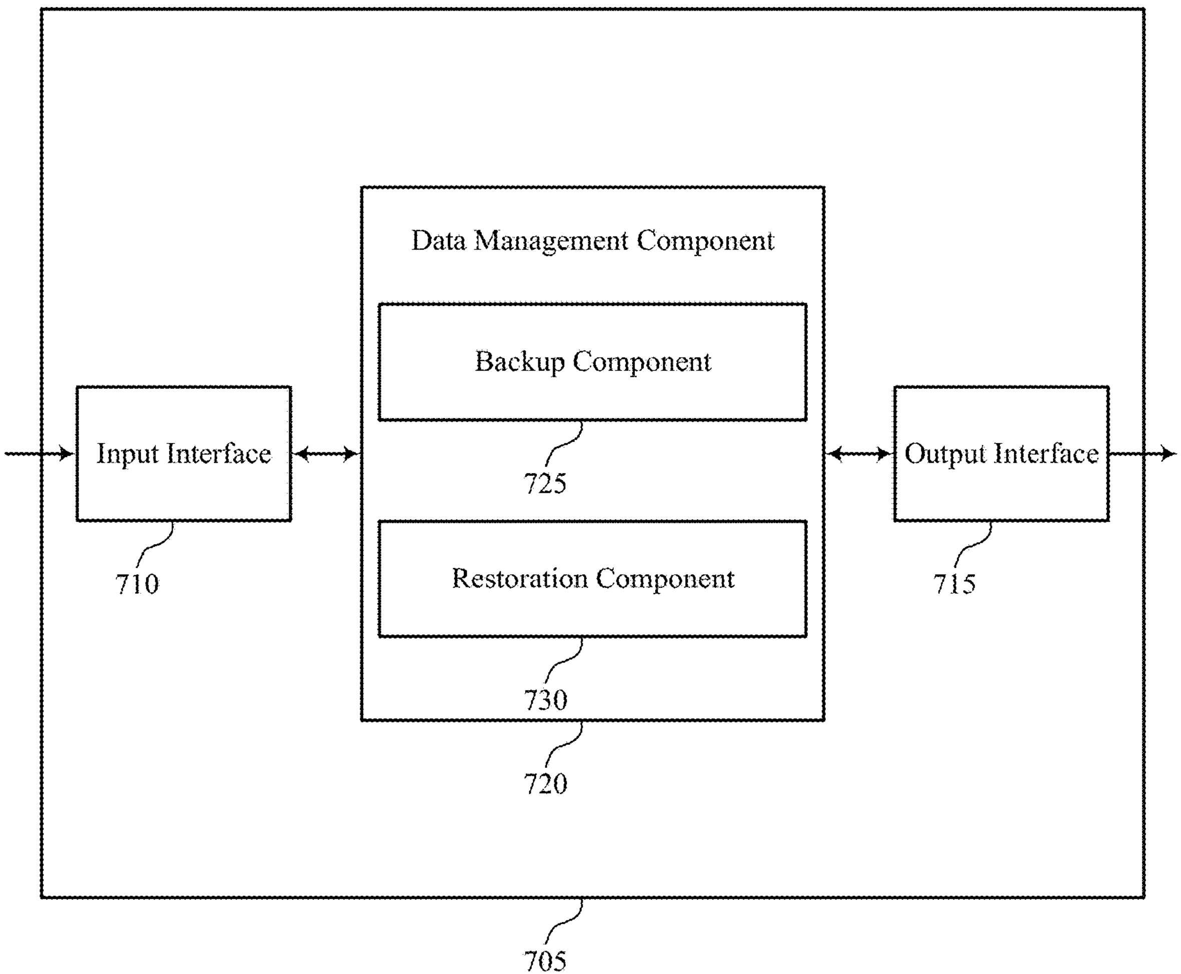
FIG. 7 shows a block diagram of an apparatus that supports preliminary processing for management of data objects in accordance with aspects of the present disclosure.

FIG. 7 shows a block diagram 700 of a system 705 that supports preliminary processing for management of data objects in accordance with aspects of the present disclosure. In some examples, the system 705 may be an example of aspects of one or more components described with reference to FIG. 1, such as a DMS 110. The system 705 may include an input interface 710, an output interface 715, and a data management component 720. The system 705 may also include one or more processors. Each of these components may be in communication with one another (e.g., via one or more buses, communications links, communications interfaces, or any combination thereof).

The input interface 710 may manage input signaling for the system 705. For example, the input interface 710 may receive input signaling (e.g., messages, packets, data, instructions, commands, or any other form of encoded information) from other systems or devices. The input interface 710 may send signaling corresponding to (e.g., representative of or otherwise based on) such input signaling to other components of the system 705 for processing. For example, the input interface 710 may transmit such corresponding signaling to the data management component 720 to support preliminary processing for management of data objects. In some cases, the input interface 710 may be a component of a network interface 925 as described with reference to FIG. 9.

The output interface 715 may manage output signaling for the system 705. For example, the output interface 715 may receive signaling from other components of the system 705, such as the data management component 720, and may transmit such output signaling corresponding to (e.g., representative of or otherwise based on) such signaling to other systems or devices. In some cases, the output interface 715 may be a component of a network interface 925 as described with reference to FIG. 9.

For example, the data management component 720 may include a backup component 725 a restoration component 730, or any combination thereof. In some examples, the data management component 720, or various components thereof, may be configured to perform various operations (e.g., receiving, monitoring, transmitting) using or otherwise in cooperation with the input interface 710, the output interface 715, or both. For example, the data management component 720 may receive information from the input interface 710, send information to the output interface 715, or be integrated in combination with the input interface 710, the output interface 715, or both to receive information, transmit information, or perform various other operations as described herein.

The backup component 725 may be configured as or otherwise support a means for performing (e.g., by a system comprising a DMS and an agent of the DMS, the agent installed at a computing system) a first procedure for capturing first point-in-time data for a data object at a computing system, where the first point-in-time data includes a set of multiple files, and where performing the first procedure includes initiating a first type of operation to back up the first point-in-time data from the computing system to a DMS, the first type of operation being native to the data object and enabling sections of files to be backed up in parallel on a per-section basis. The restoration component 730 may be configured as or otherwise support a means for performing, after the first procedure, a second procedure to restore the first point-in-time data to the computing system, where performing the second procedure includes executing, based on recreating the first point-in-time data at the DMS, the first type of operation to back up, from among the set of multiple files, sections of one or more first files in parallel on the per-section basis from the DMS to the computing system, and initiating, after backing up the sections of the one or more first files from the DMS to the computing system, a second type of operation to restore, from among the set of multiple files, one or more second files to the computing system, the second type of operation being native to the data object and enabling files to be restored in parallel on a per-file basis from the DMS to the computing system.

Figure 8:
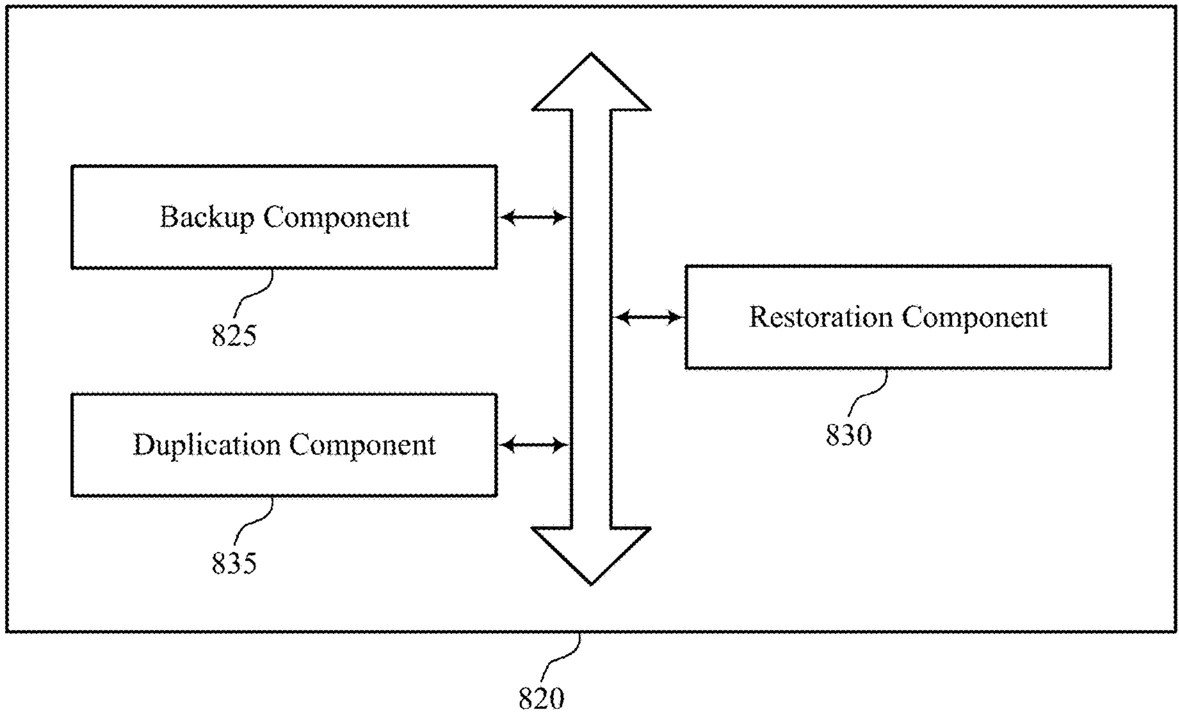
FIG. 8 shows a block diagram of a data management component that supports preliminary processing for management of data objects in accordance with aspects of the present disclosure.

FIG. 8 shows a block diagram 800 of a data management component 820 that supports preliminary processing for management of data objects in accordance with aspects of the present disclosure. The data management component 820 may be an example of aspects of a data management component or a data management component 720, or both, as described herein. The data management component 820, or various components thereof, may be an example of means for performing various aspects of preliminary processing for management of data objects as described herein. For example, the data management component 820 may include a backup component 825, a restoration component 830, a duplication component 835, or any combination thereof. Each of these components, or components of subcomponents thereof (e.g., one or more processors, one or more memories), may communicate, directly or indirectly, with one another (e.g., via one or more buses, communications links, communications interfaces, or any combination thereof). These components may be included within a DMS, an agent of the DMS, or any combination thereof. These components may also, in some examples, be implemented in distributed fashion (e.g., a first portion of a component may be included in a DMS, and a second portion of the component may be included in an agent of the DMS).

The backup component 825 may be configured as or otherwise support a means for performing (e.g., by a system comprising a DMS and an agent of the DMS, the agent installed at a computing system) a first procedure for capturing first point-in-time data for a data object at a computing system, where the first point-in-time data includes a set of multiple files, and where performing the first procedure includes initiating a first type of operation to back up the first point-in-time data from the computing system to a DMS, the first type of operation being native to the data object and enabling sections of files to be backed up in parallel on a per-section basis. The restoration component 830 may be configured as or otherwise support a means for performing, after the first procedure, a second procedure to restore the first point-in-time data to the computing system, where performing the second procedure includes executing, based on recreating the first point-in-time data at the DMS, the first type of operation to back up, from among the set of multiple files, sections of one or more first files in parallel on the per-section basis from the DMS to the computing system, and initiating, after backing up the sections of the one or more first files from the DMS to the computing system, a second type of operation to restore, from among the set of multiple files, one or more second files to the computing system, the second type of operation being native to the data object and enabling files to be restored in parallel on a per-file basis from the DMS to the computing system.

In some examples, performing the first procedure further includes storing, at the DMS and after the first point-in-time data is backed up to the DMS, the first point-in-time data using one or more image backups, and performing the second procedure further includes recreating the set of multiple files from the one or more image backups and prior to executing the first type of operation.

In some examples, the first point-in-time data is stored using a base image backup of the one or more image backups, the base image backup storing representations of the set of multiple files.

In some examples, the first point-in-time data is stored using a base image backup and an incremental image backup of the one or more image backups, the base image backup and the incremental image backup collectively storing representations of the set of multiple files.

In some examples, the one or more image backups are generated in accordance with one or more formats that are native to the DMS, and the set of multiple files are recreated in accordance with one or more formats that are native to the data object.

In some examples, initiating the first type of operation includes indicating, to the data object, a backup location at the DMS for the first point-in-time data.

In some examples, performing the second procedure further includes identifying, prior to executing the first type of operation, the one or more first files based on a size threshold, user selection, file type, or any combination thereof.

In some examples, the DMS comprises a plurality of nodes, and the restoration component 830 may be configured as or otherwise support a means for assigning, prior to executing the first type of operation, the sections of the one or more first files to the plurality of nodes, wherein, as part of the second procedure, the sections of the one or more first files are backed up to the computing system in parallel using the plurality of nodes.

In some examples, executing the first type of operation includes transferring the sections of the one or more first files to the computing system.

In some examples, the restoration component 830 may be configured as or otherwise support a means for transferring, based on initiating the second type of operation, the one or more second files to the computing system.

In some examples, the agent of the DMS is installed at the computing system and connected to the DMS via a network interface, and the agent of the DMS is used to initiate the first type of operation, execute the first type of operation, and to initiate the second type of operation.

In some examples, the data object includes a database, an application, a file system, a virtual machine, or any combination thereof, and the data object supports a file format that enables an amount of data that exceeds a size threshold to be stored in a single file.

In some examples, the size threshold is greater than or equal to 50 gigabytes.

In some examples, the duplication component 835 may be configured as or otherwise support a means for performing, by the DMS, a third procedure to copy second point-in-time data for the data object to a second computing system, where the second point-in-time data includes a second set of multiple files, and where performing the third procedure includes initiating the first type of operation to back up, from among the second set of multiple files, sections of one or more first files of the second point-in-time data in parallel on the per-section basis to the second computing system, and initiating, after backing up the sections of the one or more first files of the second point-in-time data, a third type of operation to duplicate, from among the second set of multiple files, one or more second files of the second point-in-time data in parallel on the per-file basis from the computing system to the second computing system, the third type of operation being native to the data object and enabling files to be copied in parallel on the per-file basis from the computing system to the second computing system.

Figure 9:
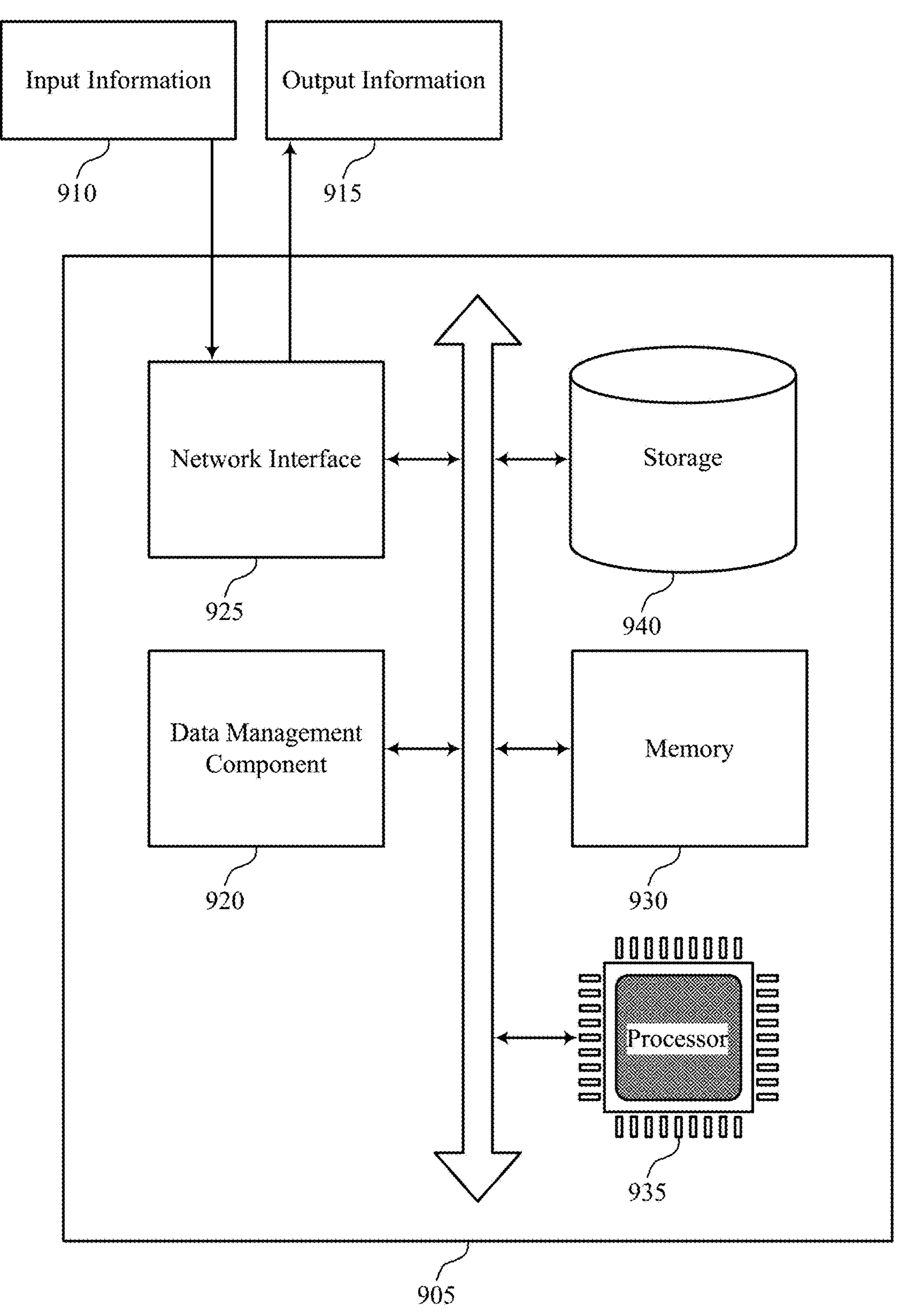
FIG. 9 shows a diagram of a system including a device that supports preliminary processing for management of data objects in accordance with aspects of the present disclosure.

FIG. 9 shows a block diagram 900 of a system 905 that supports preliminary processing for management of data objects in accordance with aspects of the present disclosure.

The system 905 may be an example of or include the components of a system 705 as described herein. The system 905 may include components for data management, including components such as a data management component 920, an input information 910, an output information 915, a network interface 925, at least one memory 930, at least one processor 935, and a storage 940. These components may be in electronic communication or otherwise coupled with each other (e.g., operatively, communicatively, functionally, electronically, electrically, via one or more buses, communications links, communications interfaces, or any combination thereof). Additionally, the components of the system 905 may include corresponding physical components or may be implemented as corresponding virtual components (e.g., components of one or more virtual machines). In some examples, the system 905 may be an example of aspects of one or more components described with reference to FIG. 1, such as a DMS 110. These components may be included within a DMS, an agent of the DMS, or any combination thereof. These components may also, in some examples, be implemented in distributed fashion (e.g., a first portion of a component may be included in a DMS, and a second portion of the component may be included in an agent of the DMS).

The network interface 925 may enable the system 905 to exchange information (e.g., input information 910, output information 915, or both) with other systems or devices (not shown). For example, the network interface 925 may enable the system 905 to connect to a network (e.g., a network 120 as described herein). The network interface 925 may include one or more wireless network interfaces, one or more wired network interfaces, or any combination thereof. In some examples, the network interface 925 may be an example of may be an example of aspects of one or more components described with reference to FIG. 1, such as one or more network interfaces 165.

Memory 930 may include RAM, ROM, or both. The memory 930 may store computer-readable, computer-executable software including instructions that, when executed, cause the processor 935 to perform various functions described herein. In some cases, the memory 930 may contain, among other things, a basic input/output system (BIOS), which may control basic hardware or software operation such as the interaction with peripheral components or devices. In some cases, the memory 930 may be an example of aspects of one or more components described with reference to FIG. 1, such as one or more memories 175.

The processor 935 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 935 may be configured to execute computer-readable instructions stored in a memory 930 to perform various functions (e.g., functions or tasks supporting preliminary processing for management of data objects). Though a single processor 935 is depicted in the example of FIG. 9, it is to be understood that the system 905 may include any quantity of one or more of processors 935 and that a group of processors 935 may collectively perform one or more functions ascribed herein to a processor, such as the processor 935. In some cases, the processor 935 may be an example of aspects of one or more components described with reference to FIG. 1, such as one or more processors 170.

Storage 940 may be configured to store data that is generated, processed, stored, or otherwise used by the system 905. In some cases, the storage 940 may include one or more HDDs, one or more SDDs, or both. In some examples, the storage 940 may be an example of a single database, a distributed database, multiple distributed databases, a data store, a data lake, or an emergency backup database. In some examples, the storage 940 may be an example of one or more components described with reference to FIG. 1, such as one or more network disks 180.

For example, the data management component 920 may be configured as or otherwise support a means for performing (e.g., by a system comprising a DMS and an agent of the DMS, the agent installed at a computing system) a first procedure for capturing first point-in-time data for a data object at a computing system, where the first point-in-time data includes a set of multiple files, and where performing the first procedure includes initiating a first type of operation to back up the first point-in-time data from the computing system to a DMS, the first type of operation being native to the data object and enabling sections of files to be backed up in parallel on a per-section basis. The data management component 920 may be configured as or otherwise support a means for performing, after the first procedure, a second procedure to restore the first point-in-time data to the computing system, where performing the second procedure includes executing, based on recreating the first point-in-time data at the DMS, the first type of operation to back up, from among the set of multiple files, sections of one or more first files in parallel on the per-section basis from the DMS to the computing system, and initiating, after backing up the sections of the one or more first files from the DMS to the computing system, a second type of operation to restore, from among the set of multiple files, one or more second files to the computing system, the second type of operation being native to the data object and enabling files to be restored in parallel on a per-file basis from the DMS to the computing system.

FIG. 10 shows a flowchart illustrating a method 1000 that supports preliminary processing for management of data objects in accordance with aspects of the present disclosure. The operations of the method 1000 may be implemented by a DMS or its components as described herein. For example, the operations of the method 1000 may be performed by a DMS as described with reference to FIGS. 1 through 9. In some examples, a DMS may execute a set of instructions to control the functional elements of the DMS to perform the described functions. Additionally, or alternatively, the DMS may perform aspects of the described functions using special-purpose hardware.

At 1005, the method may include performing a first procedure for capturing first point-in-time data for a data object at a computing system, where the first point-in-time data includes a set of multiple files, and where performing the first procedure includes initiating a first type of operation to back up the first point-in-time data from the computing system to a DMS, the first type of operation being native to the data object and enabling sections of files to be backed up in parallel on a per-section basis. The operations of block 1005 may be performed in accordance with examples as disclosed herein. In some examples, aspects of the operations of 1005 may be performed by a backup component 825 as described with reference to FIG. 8.

At 1010, the method may include performing, after the first procedure, a second procedure to restore the first point-in-time data to the computing system, where performing the second procedure includes executing, based on recreating the first point-in-time data at the DMS, the first type of operation to back up, from among the set of multiple files, sections of one or more first files in parallel on the per-section basis from the DMS to the computing system, and initiating, after backing up the sections of the one or more first files from the DMS to the computing system, a second type of operation to restore, from among the set of multiple files, one or more second files to the computing system, the second type of operation being native to the data object and enabling files to be restored in parallel on a per-file basis from the DMS to the computing system. The operations of block 1010 may be performed in accordance with examples as disclosed herein. In some examples, aspects of the operations of 1010 may be performed by a restoration component 830 as described with reference to FIG. 8.

A method by an apparatus is described. The method may include performing (e.g., by a system comprising a DMS and an agent of the DMS, the agent installed at a computing system) a first procedure for capturing first point-in-time data for a data object at a computing system, where the first point-in-time data includes a set of multiple files, and where performing the first procedure includes initiating a first type of operation to back up the first point-in-time data from the computing system to a DMS, the first type of operation being native to the data object and enabling sections of files to be backed up in parallel on a per-section basis and performing, after the first procedure, a second procedure to restore the first point-in-time data to the computing system, where performing the second procedure includes executing, based on recreating the first point-in-time data at the DMS, the first type of operation to back up, from among the set of multiple files, sections of one or more first files in parallel on the per-section basis from the DMS to the computing system, and initiating, after backing up the sections of the one or more first files from the DMS to the computing system, a second type of operation to restore, from among the set of multiple files, one or more second files to the computing system, the second type of operation being native to the data object and enabling files to be restored in parallel on a per-file basis from the DMS to the computing system.

A system is described. The system may include a DMS comprising one or more first processors and one or more first memories storing first code executable by the one or more first processors. The system may further include an agent of the DMS, wherein the agent is installed on a computing system comprising one or more second processors and one or more second memories storing second code executable by the one or more second processors. The first code and the second code may be executable by the one or more first processors and the one or more second processors, respectively, to cause the system to perform a first procedure for capturing first point-in-time data for a data object at a computing system, where the first point-in-time data includes a set of multiple files, and where performing the first procedure includes initiating a first type of operation to back up the first point-in-time data from the computing system to a DMS, the first type of operation being native to the data object and enabling sections of files to be backed up in parallel on a per-section basis, and perform, after the first procedure, a second procedure to restore the first point-in-time data to the computing system, where performing the second procedure includes executing, based on recreating the first point-in-time data at the DMS, the first type of operation to back up, from among the set of multiple files, sections of one or more first files in parallel on the per-section basis from the DMS to the computing system, and initiating, after backing up the sections of the one or more first files from the DMS to the computing system, a second type of operation to restore, from among the set of multiple files, one or more second files to the computing system, the second type of operation being native to the data object and enabling files to be restored in parallel on a per-file basis from the DMS to the computing system.

Another apparatus is described. The apparatus may include means for performing a first procedure for capturing first point-in-time data for a data object at a computing system, where the first point-in-time data includes a set of multiple files, and where performing the first procedure includes initiating a first type of operation to back up the first point-in-time data from the computing system to a DMS, the first type of operation being native to the data object and enabling sections of files to be backed up in parallel on a per-section basis, and means for performing, after the first procedure, a second procedure to restore the first point-in-time data to the computing system, where performing the second procedure includes executing, based on recreating the first point-in-time data at the DMS, the first type of operation to back up, from among the set of multiple files, sections of one or more first files in parallel on the per-section basis from the DMS to the computing system, and initiating, after backing up the sections of the one or more first files from the DMS to the computing system, a second type of operation to restore, from among the set of multiple files, one or more second files to the computing system, the second type of operation being native to the data object and enabling files to be restored in parallel on a per-file basis from the DMS to the computing system.

One or more non-transitory computer-readable media storing code is described. The code may include instructions executable by one or more processors of one or more electronic devices to cause the one or more electronic devices to perform a first procedure for capturing first point-in-time data for a data object at a computing system, where the first point-in-time data includes a set of multiple files, and where performing the first procedure includes initiating a first type of operation to back up the first point-in-time data from the computing system to a DMS, the first type of operation being native to the data object and enabling sections of files to be backed up in parallel on a per-section basis, and perform, after the first procedure, a second procedure to restore the first point-in-time data to the computing system, where performing the second procedure includes executing, based on recreating the first point-in-time data at the DMS, the first type of operation to back up, from among the set of multiple files, sections of one or more first files in parallel on the per-section basis from the DMS to the computing system, and initiating, after backing up the sections of the one or more first files from the DMS to the computing system, a second type of operation to restore, from among the set of multiple files, one or more second files to the computing system, the second type of operation being native to the data object and enabling files to be restored in parallel on a per-file basis from the DMS to the computing system.

In some examples of the method, apparatus, and non-transitory computer-readable medium described herein, operations, features, means, or instructions for performing the first procedure may further include operations, features, means, or instructions for storing, at the DMS and after the first point-in-time data may be backed up to the DMS, the first point-in-time data using one or more image backups, and operations, features, means, or instructions for performing the second procedure may further include operations, features, means, or instructions for recreating the set of multiple files from the one or more image backups and prior to executing the first type of operation.

In some examples of the method, apparatus, and non-transitory computer-readable medium described herein, the first point-in-time data may be stored using a base image backup of the one or more image backups, the base image backup storing representations of the set of multiple files.

In some examples of the method, apparatus, and non-transitory computer-readable medium described herein, the first point-in-time data may be stored using a base image backup and an incremental image backup of the one or more image backups, the base image backup and the incremental image backup collectively storing representations of the set of multiple files.

In some examples of the method, apparatus, and non-transitory computer-readable medium described herein, the one or more image backups may be generated in accordance with one or more formats that may be native to the DMS, and the set of multiple files may be recreated in accordance with one or more formats that may be native to the data object.

In some examples of the method, apparatus, and non-transitory computer-readable medium described herein, operations, features, means, or instructions for initiating the first type of operation may include operations, features, means, or instructions for indicating, to the data object, a backup location at the DMS for the first point-in-time data.

In some examples of the method, apparatus, and non-transitory computer-readable medium described herein, operations, features, means, or instructions for performing the second procedure may further include operations, features, means, or instructions for identifying, prior to executing the first type of operation, the one or more first files based on a size threshold, user selection, file type, or any combination thereof.

In some examples of the method, apparatus, and non-transitory computer-readable medium described herein, the DMS comprises a plurality of nodes, and the method, apparatus, and non-transitory computer-readable medium described herein may further include operations, features, means, or instructions for assigning, prior to executing the first type of operation, the sections of the one or more first files to the plurality of nodes, wherein, as part of the second procedure, the sections of the one or more first files are backed up to the computing system in parallel using the plurality of nodes.

In some examples of the method, apparatus, and non-transitory computer-readable medium described herein, operations, features, means, or instructions for executing the first type of operation may include operations, features, means, or instructions for transferring the sections of the one or more first files to the computing system.

Some examples of the method, apparatus, and non-transitory computer-readable medium described herein may further include operations, features, means, or instructions for transferring, based on initiating the second type of operation, the one or more second files to the computing system.

In some examples of the method, apparatus, and non-transitory computer-readable medium described herein, an agent of the DMS may be installed at the computing system and connected to the DMS via a network interface, and the agent of the DMS may be used to initiate the first type of operation, execute the first type of operation, and to initiate the second type of operation.

In some examples of the method, apparatus, and non-transitory computer-readable medium described herein, the data object includes or is a database, an application, a file system, a virtual machine, or any combination thereof, and the data object supports a file format that enables an amount of data that exceeds a size threshold to be stored in a single file.

In some examples of the method, apparatus, and non-transitory computer-readable medium described herein, the size threshold may be greater than or equal to 50 gigabytes.

Some examples of the method, apparatus, and non-transitory computer-readable medium described herein may further include operations, features, means, or instructions for performing (e.g., by the DMS) a third procedure to copy second point-in-time data for the data object to a second computing system, where the second point-in-time data includes a second set of multiple files, and where performing the third procedure includes initiating the first type of operation to back up, from among the second set of multiple files, sections of one or more first files of the second point-in-time data in parallel on the per-section basis to the second computing system, and initiating, after backing up the sections of the one or more first files of the second point-in-time data, a third type of operation to duplicate, from among the second set of multiple files, one or more second files of the second point-in-time data in parallel on the per-file basis from the computing system to the second computing system, the third type of operation being native to the data object and enabling files to be copied in parallel on the per-file basis from the computing system to the second computing system.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

performing a procedure to transfer point-in-time data for a data object to a computing system, wherein the point-in-time data comprises a plurality of files, and wherein performing the procedure comprises:

executing an instance of a first type of operation to back up, from among the plurality of files, one or more first files to the computing system, an execution of the first type of operation being supported by the data object, and the first type of operation enabling files to be backed up to the computing system in parallel on a per-section basis, and executing, based at least in part on executing the instance of the first type of operation, an instance of a second type of operation to transfer, from among the plurality of files, one or more second files to the computing system, an execution of the second type of operation being supported by the data object, and the second type of operation enabling files to be transferred in parallel on a per-file basis to the computing system.

2. The method of claim 1, wherein the procedure is performed by a data management system or a second computing system.

3. The method of claim 1, wherein:

the procedure is performed by a second computing system comprising a second data object that comprises the one or more second files, and the instance of the second type of operation is configured to copy the one or more second files of the second data object to a file location of the computing system associated with the data object.

4. The method of claim 1, wherein the procedure is performed by a data management system, the method further comprising:

performing, before the procedure to transfer the point-in-time data, a second procedure for capturing the point-in-time data, wherein performing the second procedure for capturing the point-in-time data comprises:

initiating a second instance of the first type of operation to back up the point-in-time data from a second computing system comprising a second data object that comprises the one or more second files to the data management system, wherein the execution of the first type of operation is supported by the data object and the second data object, and wherein the first type of operation enables sections of files to be backed up to the data management system in parallel on the per-section basis.

5. The method of claim 4, wherein performing the procedure further comprises:

recreating, prior to executing the instance of the first type of operation, the one or more second files of the second data object in accordance with one or more formats supported by the data object and the second data object, wherein:

the instance of the second type of operation is configured to copy the one or more second files to a file location of the computing system associated with the data object.

6. The method of claim 4, wherein the instance of the second type of operation is configured to restore, from the data management system, the one or more second files to the data object at the computing system.

7. The method of claim 4, wherein the sections of the one or more first files are backed up from the data management system to the computing system by the instance of the first type of operation.

8. The method of claim 4, wherein performing the second procedure for capturing the point-in-time data comprises:

storing, after the point-in-time data is backed up to the data management system, the point-in-time data at the data management system using one or more image backups.

9. The method of claim 8, wherein performing the procedure further comprises:

recreating, prior to executing the instance of the first type of operation, the plurality of files from the one or more image backups by the data management system, wherein:

the one or more image backups are generated in accordance with one or more formats that are supported by the data management system, and the plurality of files is recreated in accordance with one or more formats that are supported by the data object.

10. The method of claim 1, wherein the procedure is performed by a data management system, the method further comprising:

performing, before the procedure to transfer the point-in-time data, a second procedure for capturing the point-in-time data, wherein performing the second procedure for capturing the point-in-time data comprises:

initiating a second instance of the first type of operation to back up the point-in-time data from the computing system to the data management system, wherein the first type of operation enables sections of files to be backed up to the data management system in parallel on the per-section basis.

11. The method of claim 1, wherein performing the procedure comprises:

identifying, prior to executing the first type of operation, the one or more first files based at least in part on a size threshold, user selection, file type, or any combination thereof.

12. The method of claim 1, wherein:

the data object comprises a database, an application, a file system, a virtual machine, or any combination thereof, and the data object supports a file format that enables an amount of data that exceeds a size threshold to be stored in a single file.

13. The method of claim 12, wherein the size threshold is greater than or equal to 50 gigabytes.

14. A device, comprising:

one or more memories; and one or more processors, wherein the one or more memories store code comprising instructions executable, individually or collectively, by the one or more processors to cause the device to:

perform a procedure to transfer point-in-time data for a data object to a computing system, wherein the point-in-time data comprises a plurality of files, and wherein, to perform the procedure, the instructions are further executable, individually or collectively, by the one or more processors to cause the device to:

execute an instance of a first type of operation to back up, from among the plurality of files, one or more first files to the computing system, an execution of the first type of operation being supported by the data object, and the first type of operation enabling files to be backed up to the computing system in parallel on a per-section basis, and execute, based at least in part on executing the instance of the first type of operation, an instance of a second type of operation to transfer, from among the plurality of files, one or more second files to the computing system, an execution of the second type of operation being supported by the data object, and the second type of operation enabling files to be transferred in parallel on a per-file basis to the computing system.

15. The device of claim 14, wherein:

the device is a second computing system comprising a second data object that comprises the one or more second files, and the instance of the second type of operation is configured to copy the one or more second files of the second data object to a file location of the computing system associated with the data object.

16. The device of claim 14, wherein:

the device is a data management system, and the instructions are further executable, individually or collectively, by the one or more processors to cause the device to:

perform, before the procedure to transfer the point-in-time data, a second procedure for capturing the point-in-time data, wherein, to perform the second procedure, the instructions are further executable, individually or collectively, by the one or more processors to cause the device to:

initiate a second instance of the first type of operation to back up the point-in-time data from a second computing system comprising a second data object that comprises the one or more second files to the data management system, wherein the execution of the first type of operation is supported by the data object and the second data object, and wherein the first type of operation enables sections of files to be backed up to the data management system in parallel on the per-section basis.

17. The device of claim 14, wherein:

the device is a data management system, and to perform the procedure, the instructions are further executable, individually or collectively, by the one or more processors to cause the device to:

perform, before the procedure to transfer the point-in-time data, a second procedure for capturing the point-in-time data, wherein, to perform the second procedure, the instructions are further executable, individually or collectively, by the one or more processors to cause the device to:

initiate a second instance of the first type of operation to back up the point-in-time data from the computing system to the data management system, wherein the first type of operation enables sections of files to be backed up to the data management system in parallel on the per-section basis.

18. A non-transitory, computer-readable medium storing code that comprises instructions that are executable, individually or collectively, by one or more processors of a device to cause the device to:

perform a procedure to transfer point-in-time data for a data object to a computing system, wherein the point-in-time data comprises a plurality of files, and wherein, to perform the procedure, the instructions are further executable, individually or collectively, by the one or more processors to cause the device to:

execute an instance of a first type of operation to back up, from among the plurality of files, one or more first files to the computing system, an execution of the first type of operation being supported by the data object, and the first type of operation enabling files to be backed up to the computing system in parallel on a per-section basis, and execute, based at least in part on executing the instance of the first type of operation, an instance of a second type of operation to transfer, from among the plurality of files, one or more second files to the computing system, an execution of the second type of operation being supported by the data object, and the second type of operation enabling files to be transferred in parallel on a per-file basis to the computing system.

19. The non-transitory, computer-readable medium of claim 18, wherein:

the device is a second computing system comprising a second data object that comprises the one or more second files, and the instance of the second type of operation is configured to copy the one or more second files of the second data object to a file location of the computing system associated with the data object.

20. The non-transitory, computer-readable medium of claim 18, wherein:

the device is a data management system, and the instructions are further executable, individually or collectively, by the one or more processors to cause the device to:

perform, before the procedure to transfer the point-in-time data, a second procedure for capturing the point-in-time data, wherein, to perform the second procedure, the instructions are further executable, individually or collectively, by the one or more processors to cause the device to:

initiate a second instance of the first type of operation to back up the point-in-time data from the computing system to the data management system, wherein the first type of operation enables sections of files to be backed up to the data management system in parallel on the per-section basis.

* * * * *